United States Patent
Audet et al.

(10) Patent No.: US 9,733,801 B2
(45) Date of Patent: *Aug. 15, 2017

(54) EXPANDABLE AND COLLAPSIBLE ARRAYS OF ALIGNED DOCUMENTS

(71) Applicant: 9224-5489 QUEBEC INC., Montreal (CA)

(72) Inventors: Mathieu Audet, Montreal (CA); Francois Cassistat, Montreal (CA)

(73) Assignee: 9224-5489 QUEBEC INC., Montreal (CA)

( * ) Notice: Subject to any disclaimer, the term of this patent is extended or adjusted under 35 U.S.C. 154(b) by 0 days.

This patent is subject to a terminal disclaimer.

(21) Appl. No.: 14/802,208

(22) Filed: Jul. 17, 2015

(65) Prior Publication Data
US 2015/0324071 A1    Nov. 12, 2015

Related U.S. Application Data

(63) Continuation of application No. 13/244,530, filed on Sep. 25, 2011, now Pat. No. 9,122,374.
(Continued)

(51) Int. Cl.
*G06F 3/00* (2006.01)
*G06F 3/0482* (2013.01)
(Continued)

(52) U.S. Cl.
CPC ........ *G06F 3/0482* (2013.01); *G06F 3/04817* (2013.01); *G06F 3/04842* (2013.01);
(Continued)

(58) Field of Classification Search
CPC ............... G06F 3/0482; G06F 3/04817; G06F 17/30011; G06F 17/30598
See application file for complete search history.

(56) References Cited

U.S. PATENT DOCUMENTS

| | | | |
|---|---|---|---|
| 4,616,336 A | 10/1986 | Robertson | |
| 4,653,021 A | 3/1987 | Takagi | |

(Continued)

FOREIGN PATENT DOCUMENTS

| | | |
|---|---|---|
| CA | 2323268 | 10/2000 |
| EP | 2568369 | 9/2011 |

(Continued)

OTHER PUBLICATIONS

The lifestream approach to reorganizing the information world; Nicolas Carriero, Scott Fertig; Eric Freeman and David Gelernter; Apr. 1995; Yale University; United States.
(Continued)

*Primary Examiner* — Kyle Stork
(74) *Attorney, Agent, or Firm* — Mathieu Audet

(57) ABSTRACT

An embodiment provides a product comprising a machine-readable medium and machine-executable instructions for causing a computer to perform a method comprising providing expendable axes of user-selectable element displaying same user-selectable elements in corresponding axial locations along the axes of user-selectable elements to provide axial correspondence of user-selectable elements simultaneously displayed on more than one axis of user-selectable elements. A system and a graphical user interface providing the same are equally provided herein.

20 Claims, 23 Drawing Sheets

Related U.S. Application Data

(60) Provisional application No. 61/438,609, filed on Feb. 1, 2011.

(51) Int. Cl.
*G06F 3/0484* (2013.01)
*H04L 29/08* (2006.01)
*G06F 17/30* (2006.01)
*G06F 3/0481* (2013.01)

(52) U.S. Cl.
CPC .. *G06F 17/30011* (2013.01); *G06F 17/30598* (2013.01); *H04L 67/02* (2013.01)

(56) References Cited

U.S. PATENT DOCUMENTS

| | | |
|---|---|---|
| 4,817,036 A | 3/1989 | Millett |
| 5,101,500 A | 3/1992 | Marui |
| 5,115,504 A | 5/1992 | Belove |
| 5,148,154 A | 9/1992 | MacKay |
| 5,241,624 A | 8/1993 | Torres |
| 5,261,087 A | 11/1993 | Mukaino |
| 5,353,391 A | 10/1994 | Cohen |
| 5,388,197 A | 2/1995 | Rayner |
| 5,398,074 A | 3/1995 | Duffield |
| 5,414,811 A | 5/1995 | Parulski |
| 5,499,330 A | 3/1996 | Lucas |
| 5,519,828 A | 5/1996 | Rayner |
| 5,524,195 A | 6/1996 | Clanton |
| 5,535,063 A | 7/1996 | Lamming |
| 5,537,524 A | 7/1996 | Aprile |
| 5,546,528 A | 8/1996 | Johnston |
| 5,581,752 A | 12/1996 | Inoue |
| 5,598,519 A | 1/1997 | Narayanan |
| 5,602,596 A | 2/1997 | Claussen |
| 5,606,374 A | 2/1997 | Bertram |
| 5,621,456 A | 4/1997 | Florin |
| 5,621,874 A | 4/1997 | Lucas |
| 5,623,613 A | 4/1997 | Rowe |
| 5,634,064 A | 5/1997 | Warnock |
| 5,649,182 A | 7/1997 | Reitz |
| 5,659,742 A | 8/1997 | Beattie |
| 5,663,757 A | 9/1997 | Morales |
| 5,671,381 A | 9/1997 | Strasnick |
| 5,673,401 A | 9/1997 | Volk |
| 5,677,708 A | 10/1997 | Matthews, III |
| 5,680,605 A | 10/1997 | Torres |
| 5,682,511 A | 10/1997 | Sposato |
| 5,689,287 A | 11/1997 | Mackinlay |
| 5,701,500 A | 12/1997 | Ikeo |
| 5,713,031 A | 1/1998 | Saito |
| 5,740,815 A | 4/1998 | Alpins |
| 5,751,280 A | 5/1998 | Abbott |
| 5,781,188 A | 7/1998 | Amiot |
| 5,781,785 A | 7/1998 | Rowe |
| 5,786,816 A | 7/1998 | Macrae |
| 5,794,178 A | 8/1998 | Caid |
| 5,798,766 A | 8/1998 | Hayashi |
| 5,812,124 A | 9/1998 | Eick |
| 5,822,751 A | 10/1998 | Gray |
| 5,832,504 A | 11/1998 | Tripathi |
| 5,838,317 A | 11/1998 | Bolnick |
| 5,838,326 A | 11/1998 | Card |
| 5,847,707 A | 12/1998 | Hayashida |
| 5,850,218 A | 12/1998 | LaJoie |
| 5,878,410 A | 3/1999 | Zbikowski |
| 5,880,729 A | 3/1999 | Johnston |
| 5,900,879 A | 5/1999 | Berry |
| 5,903,271 A | 5/1999 | Bardon |
| 5,905,992 A | 5/1999 | Lucas |
| 5,920,859 A | 7/1999 | Li |
| 5,926,824 A | 7/1999 | Hashimoto |
| 5,933,843 A | 8/1999 | Takai |
| 5,966,127 A | 10/1999 | Yajima |
| 5,974,391 A | 10/1999 | Hongawa |
| 5,977,974 A | 11/1999 | Hatori |
| 5,980,096 A | 11/1999 | Thalhammer-Reyero |
| 5,982,369 A | 11/1999 | Sciammarella |
| 5,999,173 A | 12/1999 | Ubillos |
| 6,003,034 A | 12/1999 | Tuli |
| 6,005,601 A | 12/1999 | Ohkura |
| 6,006,227 A | 12/1999 | Freeman |
| 6,009,442 A | 12/1999 | Chen |
| 6,012,072 A | 1/2000 | Lucas |
| 6,020,930 A | 2/2000 | Legrand |
| 6,023,703 A | 2/2000 | Hill |
| 6,028,600 A | 2/2000 | Rosin |
| 6,029,164 A | 2/2000 | Birrell |
| 6,037,933 A | 3/2000 | Blonstein |
| 6,038,522 A | 3/2000 | Manson |
| 6,061,062 A | 5/2000 | Venolia |
| 6,064,384 A | 5/2000 | Ho |
| 6,067,554 A | 5/2000 | Hohensee |
| 6,078,924 A | 6/2000 | Ainsbury |
| 6,081,817 A | 6/2000 | Taguchi |
| 6,088,032 A | 7/2000 | Mackinlay |
| 6,100,887 A | 8/2000 | Bormann |
| 6,108,657 A | 8/2000 | Shoup |
| 6,111,578 A | 8/2000 | Tesler |
| 6,119,120 A | 9/2000 | Miller |
| 6,149,519 A | 11/2000 | Osaki |
| 6,151,059 A | 11/2000 | Schein |
| 6,151,604 A | 11/2000 | Wlaschin |
| 6,151,702 A | 11/2000 | Overturf |
| 6,163,345 A | 12/2000 | Noguchi |
| 6,174,845 B1 | 1/2001 | Rattinger |
| 6,175,362 B1 | 1/2001 | Harms |
| 6,175,845 B1 | 1/2001 | Smith |
| 6,185,551 B1 | 2/2001 | Birrell |
| 6,188,406 B1 | 2/2001 | Fong |
| 6,189,012 B1 | 2/2001 | Mital |
| 6,202,068 B1 | 3/2001 | Kraay |
| 6,211,873 B1 | 4/2001 | Moyer |
| 6,236,994 B1 | 5/2001 | Swartz |
| 6,237,004 B1 | 5/2001 | Dodson |
| 6,240,421 B1 | 5/2001 | Stolarz |
| 6,243,093 B1 | 6/2001 | Czerwinski |
| 6,243,724 B1 | 6/2001 | Mander |
| 6,253,218 B1 | 6/2001 | Aoki |
| 6,253,518 B1 | 7/2001 | Azar |
| 6,262,722 B1 | 7/2001 | Allison |
| 6,266,059 B1 | 7/2001 | Matthews, III |
| 6,266,098 B1 | 7/2001 | Cove |
| 6,275,229 B1 | 8/2001 | Weiner |
| 6,281,898 B1 | 8/2001 | Nikolovska |
| 6,281,940 B1 | 8/2001 | Sciammarella |
| 6,289,362 B1 | 9/2001 | Van Der Meer |
| 6,295,639 B1 | 9/2001 | Van Der Meer |
| 6,308,187 B1 | 10/2001 | DeStefano |
| 6,310,622 B1 | 10/2001 | Asente |
| 6,313,851 B1 | 11/2001 | Matthews, III |
| 6,317,761 B1 | 11/2001 | Landsman |
| 6,335,742 B1 | 1/2002 | Takemoto |
| 6,337,698 B1 | 1/2002 | Keely, Jr. |
| 6,338,044 B1 | 1/2002 | Cook et al. |
| 6,344,880 B1 | 2/2002 | Takahashi |
| 6,351,765 B1 | 2/2002 | Pietropaolo |
| 6,353,436 B1 | 3/2002 | Reichlen |
| 6,353,831 B1 | 3/2002 | Gustman |
| 6,366,299 B1 | 4/2002 | Lanning |
| 6,381,362 B1 | 4/2002 | Deshpande |
| 6,388,665 B1 | 5/2002 | Linnett |
| 6,392,651 B1 | 5/2002 | Stradley |
| 6,418,556 B1 | 7/2002 | Bennington |
| 6,425,129 B1 | 7/2002 | Sciammarella |
| 6,434,545 B1 | 8/2002 | MacLeod |
| 6,434,598 B1 | 8/2002 | Gish |
| 6,456,938 B1 | 9/2002 | Barnard |
| 6,457,006 B1 | 9/2002 | Gruenwald |
| 6,457,017 B2 | 9/2002 | Watkins |
| 6,463,431 B1 | 10/2002 | Schmitt |
| 6,466,237 B1 | 10/2002 | Miyao |
| 6,487,557 B1 | 11/2002 | Nagatomo |
| 6,491,585 B1 | 12/2002 | Miyamoto |

(56) References Cited

U.S. PATENT DOCUMENTS

| | | |
|---|---|---|
| 6,501,469 B1 | 12/2002 | MacPhail |
| 6,507,858 B1 | 1/2003 | Kanerva |
| 6,538,672 B1 | 3/2003 | Dobbelaar |
| 6,542,896 B1 | 4/2003 | Gruenwald |
| 6,553,310 B1 | 4/2003 | Lopke |
| 6,556,225 B1 | 4/2003 | MacPhail |
| 6,577,350 B1 | 6/2003 | Proehl |
| 6,581,068 B1 | 6/2003 | Bensoussan |
| 6,587,106 B1 | 7/2003 | Suzuki |
| 6,594,673 B1 | 7/2003 | Smith |
| 6,598,043 B1 | 7/2003 | Baclawski |
| 6,600,501 B1 | 7/2003 | Israel |
| D478,090 S | 8/2003 | Nguyen |
| 6,604,144 B1 | 8/2003 | Anders |
| 6,613,100 B2 | 9/2003 | Miller |
| 6,636,246 B1 | 10/2003 | Gallo |
| 6,638,313 B1 | 10/2003 | Freeman |
| 6,642,939 B1 | 11/2003 | Vallone |
| 6,650,343 B1 | 11/2003 | Fujita |
| 6,662,357 B1 | 12/2003 | Bowman-Amuah |
| 6,668,102 B2 | 12/2003 | Chiba |
| 6,671,692 B1 | 12/2003 | Farner |
| 6,671,693 B1 | 12/2003 | Marpe |
| 6,671,694 B2 | 12/2003 | Baskins |
| 6,675,158 B1 | 1/2004 | Rising, III |
| 6,678,671 B1 | 1/2004 | Petrovic |
| 6,678,694 B1 | 1/2004 | Zimmermann |
| 6,678,891 B1 | 1/2004 | Wilcox |
| 6,684,249 B1 | 1/2004 | Frerichs |
| 6,690,391 B1 | 2/2004 | Kim |
| 6,691,127 B1 | 2/2004 | Bauer |
| 6,694,326 B2 | 2/2004 | Mayhew |
| 6,694,335 B1 | 2/2004 | Hopmann |
| 6,694,486 B2 | 2/2004 | Frank |
| 6,701,318 B2 | 3/2004 | Fox |
| 6,704,727 B1 | 3/2004 | Kravets |
| 6,704,744 B1 | 3/2004 | Williamson |
| 6,721,760 B1 | 4/2004 | Ono |
| 6,725,232 B2 | 4/2004 | Bradley |
| 6,725,427 B2 | 4/2004 | Freeman |
| 6,735,591 B2 | 5/2004 | Khan |
| 6,738,787 B2 | 5/2004 | Stead |
| 6,744,447 B2 | 6/2004 | Estrada |
| 6,744,967 B2 | 6/2004 | Kaminski |
| 6,754,660 B1 | 6/2004 | MacPhail |
| 6,760,721 B1 | 7/2004 | Chasen |
| 6,768,999 B2 | 7/2004 | Prager |
| 6,772,148 B2 | 8/2004 | Baclawski |
| 6,859,803 B2 | 2/2005 | Dagtas |
| 6,862,027 B2 | 3/2005 | Andrews |
| 6,865,717 B2 | 3/2005 | Wright |
| 6,879,946 B2 | 4/2005 | Rong |
| 6,889,220 B2 | 5/2005 | Wolff |
| 6,900,807 B1 | 5/2005 | Liongosari |
| 6,901,558 B1 | 5/2005 | Andreas |
| 6,915,254 B1 | 7/2005 | Heinze |
| 6,915,489 B2 | 7/2005 | Gargi |
| 6,922,699 B2 | 7/2005 | Schuetze |
| 6,925,611 B2 | 8/2005 | SanGiovanni |
| 6,927,770 B2 | 8/2005 | Ording |
| 6,934,916 B1 | 8/2005 | Webb |
| 6,948,124 B2 | 9/2005 | Combs |
| 6,961,900 B1 | 11/2005 | Sprague |
| 6,965,380 B1 | 11/2005 | Kumata |
| 6,973,628 B2 | 12/2005 | Asami |
| 6,983,227 B1 | 1/2006 | Thalhammer-Reyero |
| 6,985,948 B2 | 1/2006 | Taguchi |
| 6,987,220 B1 | 1/2006 | Holcombe |
| 6,990,637 B2 | 1/2006 | Anthony |
| 7,007,034 B1 | 2/2006 | Hartman |
| 7,010,744 B1 | 3/2006 | Torgerson |
| 7,019,741 B2 | 3/2006 | Kelly |
| 7,020,848 B2 | 3/2006 | Rosenzweig |
| 7,055,104 B1 | 5/2006 | Billmaier |
| 7,080,394 B2 | 7/2006 | Istvan |
| 7,088,859 B1 | 8/2006 | Yamaguchi |
| 7,107,531 B2 | 9/2006 | Billmaier |
| 7,107,532 B1 | 9/2006 | Billmaier |
| 7,113,975 B2 | 9/2006 | Nakayama |
| 7,117,199 B2 | 10/2006 | Frank |
| 7,137,067 B2 | 11/2006 | Yanase |
| 7,139,006 B2 | 11/2006 | Wittenburg |
| 7,149,983 B1 | 12/2006 | Robertson |
| 7,155,675 B2 | 12/2006 | Billmaier |
| 7,159,177 B2 | 1/2007 | Billmaier |
| 7,199,809 B1 | 4/2007 | Lacy |
| 7,218,325 B1 | 5/2007 | Buck |
| 7,220,910 B2 | 5/2007 | Plastina |
| 7,234,114 B2 | 6/2007 | Kurtz |
| 7,266,768 B2 | 9/2007 | Ferlitsch |
| 7,289,981 B2 | 10/2007 | Chang |
| 7,290,698 B2 | 11/2007 | Poslinski |
| 7,293,228 B1 | 11/2007 | Lessing |
| 7,302,649 B2 | 11/2007 | Ohnishi |
| 7,318,196 B2 | 1/2008 | Crow |
| 7,334,191 B1 | 2/2008 | Sivan |
| 7,336,279 B1 | 2/2008 | Takiguchi |
| 7,346,600 B2 | 3/2008 | Nakao |
| 7,346,850 B2 | 3/2008 | Swartz |
| 7,350,157 B1 | 3/2008 | Billmaier |
| 7,353,461 B2 | 4/2008 | Davidsson |
| 7,363,591 B2 | 4/2008 | Goldthwaite |
| 7,366,994 B2 | 4/2008 | Loui |
| 7,372,473 B2 | 5/2008 | Venolia |
| 7,380,260 B1 | 5/2008 | Billmaier |
| 7,418,674 B2 | 8/2008 | Robbins |
| 7,444,598 B2 | 10/2008 | Horvitz |
| 7,447,713 B1 | 11/2008 | Berkheimer |
| 7,448,950 B2 | 11/2008 | Matsumoto |
| 7,458,033 B2 | 11/2008 | Bacigalupi |
| 7,502,819 B2 | 3/2009 | Alonso |
| D589,972 S | 4/2009 | Casagrande et al. |
| 7,594,246 B1 | 9/2009 | Billmaier |
| 7,606,819 B2 | 10/2009 | Audet |
| 7,607,104 B2 | 10/2009 | Maeda |
| 7,629,527 B2 | 12/2009 | Hiner |
| 7,650,569 B1 | 1/2010 | Allen |
| 7,661,075 B2 | 2/2010 | Lahdesmaki |
| 7,680,817 B2 | 3/2010 | Audet |
| 7,681,128 B2 | 3/2010 | Yamamoto |
| 7,681,149 B2 | 3/2010 | Lahdesmaki |
| D614,197 S | 4/2010 | Casagrande |
| 7,703,040 B2 | 4/2010 | Cutrell |
| 7,710,423 B2 | 5/2010 | Drucker |
| 7,714,859 B2 | 5/2010 | Shoemaker |
| 7,716,194 B2 | 5/2010 | Williams |
| 7,716,604 B2 | 5/2010 | Kataoka |
| 7,735,102 B1 | 6/2010 | Billmaier |
| 7,739,598 B2 | 6/2010 | Porter |
| 7,739,622 B2 | 6/2010 | DeLine |
| 7,757,253 B2 | 7/2010 | Rappaport |
| 7,761,471 B1 | 7/2010 | Lee |
| 7,765,184 B2 | 7/2010 | Makela |
| 7,765,195 B2 | 7/2010 | Miller |
| 7,770,117 B1 | 8/2010 | Uy |
| 7,770,217 B2 | 8/2010 | Pueblas |
| 7,788,247 B2 | 8/2010 | Wang |
| 7,788,592 B2 | 8/2010 | Williams |
| 7,792,328 B2 | 9/2010 | Albertson |
| 7,818,378 B2 | 10/2010 | Buchheit |
| 7,822,735 B2 | 10/2010 | Suda |
| 7,844,074 B2 | 11/2010 | Moskowitz |
| 7,856,424 B2 | 12/2010 | Cisler |
| 7,870,489 B2 | 1/2011 | Serita |
| 7,899,818 B2 | 3/2011 | Stonehocker |
| 7,902,741 B2 | 3/2011 | Iwanaga |
| 7,949,691 B1 | 5/2011 | Franciscus de Heer |
| 7,991,720 B2 | 8/2011 | Mander |
| 8,001,481 B2 | 8/2011 | Al Chakra |
| 8,010,508 B2 | 8/2011 | Audet |
| 8,010,892 B2 | 8/2011 | Audet |
| 8,010,903 B2 | 8/2011 | Dieberger |
| 8,069,404 B2 | 11/2011 | Audet |
| 8,078,966 B2 | 12/2011 | Audet |

(56) References Cited

U.S. PATENT DOCUMENTS

| | | |
|---|---|---|
| 8,091,033 B2 | 1/2012 | von Sichart |
| 8,099,680 B1 | 1/2012 | Kolde |
| 8,136,030 B2 | 3/2012 | Audet |
| 8,151,185 B2 | 4/2012 | Audet |
| 8,307,355 B2 | 11/2012 | Capomassi |
| 8,707,169 B2 | 4/2014 | Morita |
| 8,762,380 B2 | 6/2014 | Shirai |
| 2001/0003186 A1 | 6/2001 | DeStefano |
| 2001/0025288 A1 | 9/2001 | Yanase |
| 2001/0034766 A1 | 10/2001 | Morimoto |
| 2001/0055017 A1 | 12/2001 | Ording |
| 2002/0032696 A1 | 3/2002 | Takiguchi |
| 2002/0033848 A1 | 3/2002 | Sciammarella |
| 2002/0035563 A1 | 3/2002 | Suda |
| 2002/0056129 A1 | 5/2002 | Blackketter |
| 2002/0059215 A1 | 5/2002 | Kotani |
| 2002/0070958 A1 | 6/2002 | Yeo |
| 2002/0078440 A1 | 6/2002 | Feinberg |
| 2002/0087530 A1 | 7/2002 | Smith |
| 2002/0091739 A1 | 7/2002 | Ferlitsch |
| 2002/0096831 A1 | 7/2002 | Nakayama |
| 2002/0101458 A1 | 8/2002 | SanGiovanni |
| 2002/0105541 A1 | 8/2002 | Endou |
| 2002/0140719 A1 | 10/2002 | Amir |
| 2002/0140740 A1 | 10/2002 | Chen |
| 2002/0152474 A1 | 10/2002 | Dudkiewicz |
| 2002/0180795 A1 | 12/2002 | Wright |
| 2003/0001898 A1 | 1/2003 | Bernhardson |
| 2003/0001901 A1 | 1/2003 | Crinon |
| 2003/0030664 A1 | 2/2003 | Parry |
| 2003/0037051 A1 | 2/2003 | Gruenwald |
| 2003/0046693 A1 | 3/2003 | Billmaier |
| 2003/0046694 A1 | 3/2003 | Istvan |
| 2003/0046695 A1 | 3/2003 | Billmaier |
| 2003/0052900 A1 | 3/2003 | Card |
| 2003/0090524 A1 | 5/2003 | Segerberg |
| 2003/0093260 A1 | 5/2003 | Dagtas |
| 2003/0093792 A1 | 5/2003 | Labeeb |
| 2003/0095149 A1 | 5/2003 | Fredriksson |
| 2003/0120681 A1 | 6/2003 | Baclawski |
| 2003/0120737 A1 | 6/2003 | Lytle |
| 2003/0121055 A1 | 6/2003 | Kaminski |
| 2003/0128228 A1 | 7/2003 | Crow |
| 2003/0132971 A1 | 7/2003 | Billmaier |
| 2003/0140023 A1 | 7/2003 | Ferguson |
| 2003/0142136 A1 | 7/2003 | Carter |
| 2003/0149939 A1 | 8/2003 | Hubel |
| 2003/0163468 A1 | 8/2003 | Freeman |
| 2003/0167902 A1 | 9/2003 | Hiner |
| 2003/0190950 A1 | 10/2003 | Matsumoto |
| 2003/0237047 A1 | 12/2003 | Borson |
| 2004/0003398 A1 | 1/2004 | Donian |
| 2004/0024738 A1 | 2/2004 | Yamane |
| 2004/0054968 A1 | 3/2004 | Savage |
| 2004/0064473 A1 | 4/2004 | Thomas |
| 2004/0090439 A1 | 5/2004 | Dillner |
| 2004/0111401 A1 | 6/2004 | Chang |
| 2004/0125143 A1 | 7/2004 | Deaton |
| 2004/0128277 A1 | 7/2004 | Mander |
| 2004/0128377 A1 | 7/2004 | Sadaghiany |
| 2004/0139143 A1 | 7/2004 | Canakapalli |
| 2004/0143598 A1 | 7/2004 | Drucker |
| 2004/0150657 A1 | 8/2004 | Wittenburg |
| 2004/0160416 A1 | 8/2004 | Venolia |
| 2004/0172593 A1 | 9/2004 | Wong |
| 2004/0177319 A1 | 9/2004 | Horn |
| 2004/0233238 A1 | 11/2004 | Lahdesmaki |
| 2004/0233239 A1 | 11/2004 | Lahdesmaki |
| 2004/0263519 A1 | 12/2004 | Andrews |
| 2005/0022132 A1 | 1/2005 | Herzberg |
| 2005/0060667 A1 | 3/2005 | Robbins |
| 2005/0119936 A1 | 6/2005 | Buchanan |
| 2005/0138066 A1 | 6/2005 | Finke-Anlauff |
| 2005/0210410 A1 | 9/2005 | Ohwa |
| 2005/0262533 A1 | 11/2005 | Hart |
| 2006/0000484 A1 | 1/2006 | Romanchik |
| 2006/0004848 A1 | 1/2006 | Williams |
| 2006/0013554 A1 | 1/2006 | Poslinski |
| 2006/0013555 A1 | 1/2006 | Poslinski |
| 2006/0013556 A1 | 1/2006 | Poslinski |
| 2006/0013557 A1 | 1/2006 | Poslinski |
| 2006/0020966 A1 | 1/2006 | Poslinski |
| 2006/0020971 A1 | 1/2006 | Poslinski |
| 2006/0041521 A1 | 2/2006 | Oral |
| 2006/0045470 A1 | 3/2006 | Poslinski |
| 2006/0075338 A1 | 4/2006 | Kusakabe |
| 2006/0136466 A1 | 6/2006 | Weiner |
| 2006/0156246 A1 | 7/2006 | Williams |
| 2006/0197782 A1 | 9/2006 | Sellers |
| 2006/0209069 A1 | 9/2006 | Bacigalupi |
| 2006/0236251 A1 | 10/2006 | Kataoka |
| 2006/0242178 A1 | 10/2006 | Butterfield |
| 2006/0248129 A1 | 11/2006 | Carnes |
| 2006/0259511 A1 | 11/2006 | Boerries |
| 2007/0005576 A1 | 1/2007 | Cutrell |
| 2007/0007884 A1 | 1/2007 | Iwanaga |
| 2007/0061745 A1 | 3/2007 | Anthony |
| 2007/0061855 A1 | 3/2007 | Serita |
| 2007/0067290 A1 | 3/2007 | Makela |
| 2007/0083505 A1 | 4/2007 | Ferrari |
| 2007/0083527 A1 | 4/2007 | Wadler |
| 2007/0100842 A1 | 5/2007 | Wykes |
| 2007/0120856 A1 | 5/2007 | De Ruyter |
| 2007/0136687 A1 | 6/2007 | Pak |
| 2007/0143803 A1 | 6/2007 | Lim |
| 2007/0156654 A1 | 7/2007 | Ravinarayanan |
| 2007/0168877 A1 | 7/2007 | Jain |
| 2007/0171224 A1 | 7/2007 | MacPherson |
| 2007/0185826 A1 | 8/2007 | Brice |
| 2007/0192749 A1 | 8/2007 | Baudisch |
| 2007/0204218 A1 | 8/2007 | Weber |
| 2007/0208679 A1 | 9/2007 | Tseng |
| 2007/0214169 A1 | 9/2007 | Audet |
| 2007/0216694 A1 | 9/2007 | Audet |
| 2007/0220209 A1 | 9/2007 | Maeda |
| 2007/0239676 A1 | 10/2007 | Stonehocker |
| 2007/0271508 A1 | 11/2007 | Audet |
| 2007/0272508 A1 | 11/2007 | Toya |
| 2008/0000126 A1 | 1/2008 | Teza |
| 2008/0015911 A1 | 1/2008 | Wang |
| 2008/0016142 A1 | 1/2008 | Schneider |
| 2008/0019371 A1 | 1/2008 | Anschutz |
| 2008/0022199 A1 | 1/2008 | Sako |
| 2008/0024444 A1 | 1/2008 | Abe |
| 2008/0046844 A1 | 2/2008 | Sugie |
| 2008/0058106 A1 | 3/2008 | Audet |
| 2008/0059897 A1 | 3/2008 | Dilorenzo |
| 2008/0065995 A1 | 3/2008 | Bell |
| 2008/0071822 A1 | 3/2008 | Audet |
| 2008/0072169 A1 | 3/2008 | Audet |
| 2008/0077756 A1 | 3/2008 | Shibata |
| 2008/0092038 A1 | 4/2008 | Audet |
| 2008/0098323 A1 | 4/2008 | Vallone |
| 2008/0104534 A1 | 5/2008 | Park |
| 2008/0118219 A1 | 5/2008 | Chang |
| 2008/0133579 A1 | 6/2008 | Lim |
| 2008/0134013 A1 | 6/2008 | Audet |
| 2008/0134022 A1 | 6/2008 | Audet |
| 2008/0140448 A1 | 6/2008 | Hernandez |
| 2008/0141115 A1 | 6/2008 | Audet |
| 2008/0155474 A1 | 6/2008 | Duhig |
| 2008/0163048 A1 | 7/2008 | Gossweiler, III |
| 2008/0174790 A1 | 7/2008 | Noguchi |
| 2008/0186305 A1 | 8/2008 | Carter |
| 2008/0243778 A1 | 10/2008 | Behnen |
| 2008/0244437 A1 | 10/2008 | Fischer |
| 2008/0256473 A1 | 10/2008 | Chakra |
| 2008/0256474 A1 | 10/2008 | Chakra |
| 2008/0270361 A1 | 10/2008 | Meyer |
| 2008/0270928 A1 | 10/2008 | Chakra |
| 2008/0282198 A1 | 11/2008 | Brooks |
| 2008/0294651 A1 | 11/2008 | Masuyama |
| 2008/0295016 A1 | 11/2008 | Audet |
| 2008/0295036 A1 | 11/2008 | Ikeda |

(56) References Cited

U.S. PATENT DOCUMENTS

| | | |
|---|---|---|
| 2008/0298697 A1 | 12/2008 | Lee |
| 2008/0299989 A1 | 12/2008 | King |
| 2008/0301562 A1 | 12/2008 | Berger |
| 2008/0307348 A1 | 12/2008 | Jones |
| 2009/0018996 A1 | 1/2009 | Hunt |
| 2009/0019371 A1 | 1/2009 | Audet |
| 2009/0048981 A1 | 2/2009 | McBain Millan |
| 2009/0055413 A1 | 2/2009 | Audet |
| 2009/0055726 A1 | 2/2009 | Audet |
| 2009/0055729 A1 | 2/2009 | Audet |
| 2009/0055763 A1 | 2/2009 | Audet |
| 2009/0055776 A1 | 2/2009 | Audet |
| 2009/0063552 A1 | 3/2009 | Jones |
| 2009/0064029 A1 | 3/2009 | Corkran |
| 2009/0064143 A1 | 3/2009 | Bhogal |
| 2009/0070662 A1 | 3/2009 | Audet |
| 2009/0070699 A1 | 3/2009 | Birkill |
| 2009/0083260 A1 | 3/2009 | Artom |
| 2009/0083859 A1 | 3/2009 | Roth |
| 2009/0106684 A1 | 4/2009 | Chakra |
| 2009/0106685 A1 | 4/2009 | Care |
| 2009/0113334 A1 | 4/2009 | Chakra |
| 2009/0116817 A1 | 5/2009 | Kim |
| 2009/0150832 A1 | 6/2009 | Keller |
| 2009/0164933 A1 | 6/2009 | Pederson |
| 2009/0177754 A1 | 7/2009 | Brezina |
| 2009/0199119 A1 | 8/2009 | Park |
| 2009/0199302 A1 | 8/2009 | So |
| 2009/0210862 A1 | 8/2009 | Viswanadha |
| 2009/0228774 A1 | 9/2009 | Matheny |
| 2009/0228788 A1 | 9/2009 | Audet |
| 2009/0235194 A1 | 9/2009 | Arndt |
| 2009/0254850 A1 | 10/2009 | Almeida |
| 2009/0265372 A1 | 10/2009 | Esmann-Jensen |
| 2009/0284658 A1 | 11/2009 | Cho |
| 2009/0287693 A1 | 11/2009 | Audet |
| 2009/0288006 A1 | 11/2009 | Audet |
| 2009/0307629 A1 | 12/2009 | Horiuchi |
| 2009/0319933 A1 | 12/2009 | Zaika |
| 2010/0023500 A1 | 1/2010 | Bascom |
| 2010/0057576 A1 | 3/2010 | Brodersen |
| 2010/0070919 A1 | 3/2010 | Araumi |
| 2010/0077355 A1 | 3/2010 | Belinsky |
| 2010/0082427 A1 | 4/2010 | Burgener |
| 2010/0082653 A1 | 4/2010 | Nair |
| 2010/0083159 A1 | 4/2010 | Mountain |
| 2010/0094890 A1 | 4/2010 | Bokor |
| 2010/0145976 A1 | 6/2010 | Higgins |
| 2010/0146380 A1 | 6/2010 | Rousso |
| 2010/0150522 A1 | 6/2010 | Schmehl |
| 2010/0169823 A1 | 7/2010 | Audet |
| 2010/0171861 A1 | 7/2010 | Ota |
| 2010/0185509 A1 | 7/2010 | Higgins |
| 2010/0205563 A1 | 8/2010 | Haapsaari |
| 2010/0313158 A1 | 12/2010 | Lee |
| 2010/0313159 A1 | 12/2010 | Decker |
| 2010/0318200 A1 | 12/2010 | Foslien |
| 2010/0325132 A1 | 12/2010 | Liu |
| 2010/0325134 A1 | 12/2010 | Galfond |
| 2010/0332512 A1 | 12/2010 | Shpits |
| 2010/0333031 A1 | 12/2010 | Castelli |
| 2011/0010667 A1 | 1/2011 | Sakai |
| 2011/0012927 A1 | 1/2011 | Lin |
| 2011/0035700 A1 | 2/2011 | Meaney |
| 2011/0061082 A1 | 3/2011 | Heo |
| 2011/0078166 A1 | 3/2011 | Oliver |
| 2011/0145745 A1 | 6/2011 | Hyeon |
| 2011/0154213 A1 | 6/2011 | Wheatley |
| 2011/0246926 A1 | 10/2011 | Newton |
| 2011/0307814 A1 | 12/2011 | Audet |
| 2012/0159320 A1 | 6/2012 | Audet |
| 2012/0183273 A1 | 7/2012 | Utsuki |
| 2012/0198385 A1 | 8/2012 | Audet |
| 2012/0198389 A1 | 8/2012 | Audet |
| 2012/0249581 A1 | 10/2012 | Cassistat |
| 2012/0260204 A1 | 10/2012 | Audet |
| 2012/0262398 A1 | 10/2012 | Kim |
| 2013/0080880 A1 | 3/2013 | Cassistat |
| 2013/0080888 A1 | 3/2013 | Audet |

FOREIGN PATENT DOCUMENTS

| | | |
|---|---|---|
| JP | 07-013971 | 1/1995 |
| JP | 07-085080 | 3/1995 |
| JP | 08-016612 | 1/1996 |
| JP | 09-016809 | 1/1997 |
| JP | 09-265480 | 10/1997 |
| JP | 09-288659 | 11/1997 |
| JP | 10-143414 | 5/1998 |
| JP | 10-149432 | 6/1998 |
| JP | 10-275222 | 10/1998 |
| JP | 11-120180 | 4/1999 |
| JP | 11-195028 | 7/1999 |
| JP | 11-212988 | 8/1999 |
| JP | 2000-099540 | 4/2000 |
| JP | 2000-250942 | 9/2000 |
| JP | 2000-293281 | 10/2000 |
| JP | 2000-348040 | 12/2000 |
| JP | 2001-005822 | 1/2001 |
| JP | 2001-092737 | 4/2001 |
| JP | 2001-101227 | 4/2001 |
| JP | 2001-167288 | 6/2001 |
| JP | 2001-243244 | 9/2001 |
| JP | 2001-282816 | 10/2001 |
| JP | 2001-331514 | 11/2001 |
| JP | 2001-337762 | 12/2001 |
| JP | 2001-337953 | 12/2001 |
| JP | 2002-056411 | 2/2002 |
| WO | WO 99/03271 | 1/1999 |
| WO | WO 00/65429 | 11/2000 |
| WO | WO 01/22194 | 3/2001 |
| WO | WO 01/63378 | 8/2001 |
| WO | WO 01/98881 | 12/2001 |
| WO | WO 02/099241 | 12/2002 |
| WO | WO 03/001345 | 1/2003 |
| WO | WO 03/032199 | 4/2003 |
| WO | WO 2005/045756 | 5/2005 |
| WO | WO 2005/083595 | 9/2005 |
| WO | WO 2007/095997 | 8/2007 |
| WO | WO 2008/030779 | 3/2008 |

OTHER PUBLICATIONS

Haystack Project; David R. Karger, Stephen J. Garland, Karun Bakshi, David Huynh, Nicholas Matsakis, Dennis Quan, Vineet Sinha, Jaime Teevan, Yuan Shen, Punyashloka Biswal, Artem Gleyzer, Ryan Manuel, Alexandre P. Poliakov, Amanda Smith, Lynn A. Stein, Eytan Adar, Mark Asdoorian, Robert Aspell, Wendy Chien, Gabriel Cunningham, Jonathan Derryberry, Adam Holt, Joshua Kramer, Percy Liang, Ilya Lisansky, Aidan Low, Enrique A. Muñoz Torres, Mark Rosen, Kai Shih, Svetlana Shnitser, Ben Walter, Marina Zhurakhinskaya; Massachsetts Institute of Technology; http://web.archive.org/web/20070415053620/http://haystack.lcs.mit.edu/ ; http://groups.csail.mit.edu/haystack/ ; http://en.wikipedia.org/wiki/Haystack_MIT_project%29 ; published May 10, 2013.

Chandler Project; Grant Baillie, Jeffrey Harris, Sheila Mooney, Katie Capps Parlante, Jared Rhine, Mimi Yin, Eugene Kim, Alex Russell, Andre Mueninghoff, Al Cho, Aleks Totic, Alec Flett, Andi Vajda, Andy Hertzfeld, Aparna Kadakia, Bobby Rullo, Brendan O'Connor, Brian Douglas Skinner, Brian Kirsch, Brian Moseley, Bryan Stearns, Chao Lam, Chris Haumesser, David Surovell, Donn Denman, Ducky Sherwood, Ed Bindl, Edward Chao, Heikki Toivonen, Jed Burgess, John Anderson, John Townsend, Jürgen Botz, Lisa Dusseault, Lori Motko, Lou Montulli, Mark Jaffe, Matthew Eernisse, Michael Toy, Mike Taylor, Mitch Kapor, Morgen Sagen, Pieter Hartsook, Philippe Bossut, Priscilla Chung, Robin Dunn, Randy Letness, Rys McCusker, Stuart Parmenter, Suzette Tauber, Ted Leung, Travis Vachon, Vinubalaji Gopal ; Open Source Applications Foundation ; http://chandlerproject.org/ ; Published May 10, 2013.

(56) References Cited

OTHER PUBLICATIONS

Emacs Org-Mode; Carsten, Bastien Guerry, Eric Shulte, Dan Davison, John Wiegley, Sebastian Rose, Nicolas Goaziou, Achim Gratz, Nick Dokos, Russel Adams, Suvayu Ali, Luis Anaya, Thomas Baumann, Michael Brand, Christophe Bataillon, Alex Bochannek, Jan BÃ¶cker, Brad Bozarth, Tom Breton, Charles Cave, Pavel Chalmoviansky, Gregory Chernov, Sacha Chua, Toby S. Cubitt, Baoqiu Cui, Eddward DeVilla, Nick Dokos, Kees Dullemond, Thomas S. Dye, Christian Egli, David Emery, Nic Ferrier, Miguel A. Figueroa-Villanueva, John Foerch, Raimar Finken, Mikael Fornius, Austin Frank, Eric Fraga, Barry Gidden, Niels Giesen, Nicolas Goaziou, Kai Grossjohann, Brian Gough, Bernt Hansen, Manuel Hermenegildo, Phil Jackson, Scott Jaderholm, Matt Jones, Tokuya Kameshima, Jonathan Leech-Pepin, Shidai Liu, Matt Lundin, David Maus, Jason F. McBrayer, Max Mikhanosha, Dmitri Minaev, Stefan Monnier, Richard Moreland, Rick Moynihan, Todd Neal, Greg Newman, Tim O'Callaghan, Osamu Okano, Takeshi Okano, Oliver Oppitz, Scott Otterson, Pete Phillips, Francesco Pizzolante, Martin Pohlack, T.V. Raman, Matthias Rempe, Paul Rivier, Kevin Rogers, Frank Ruell, Jason Riedy, Philip Rooke, Christian Schlauer, Christopher Schmidt, Paul Sexton, Tom Shannon, Ilya Shlyakhter, Stathis Sideris, Daniel Sinder, Dale Smith, James TD Smith, Adam Spiers, Ulf Stegemann, Andy Stewart, David O'Toole, Jambunathan K, Sebastien Vauban, Stefan Vollmar, Jürgen Vollmer, Samuel Wales, Chris Wallace, David Wainberg, Carsten Wimmer, Roland Winkler, Piotr Zielinski; http://orgmode.org/ ; Published May 10, 2013.

EXPANDABLE AND COLLAPSIBLE ARRAYS OF ALIGNED DOCUMENTS

CROSS-REFERENCES

The present invention relates to, claims priority from and is a continuation application of U.S. patent application Ser. No. 13/244,530, filed on Sep. 25, 2011, entitled EXPANDABLE AND COLLAPSIBLE ARRAY OF DOCUMENTS, which relates to and claims priority from U.S. Provisional patent application No. 61/438,609, filed on Feb. 1, 2011, entitled ACTIVE AND SELECTED DOCUMENTS ON ARRAYS THEREOF; EXPANDABLE AND COLLAPSIBLE ARRAYS OF DOCUMENTS; NON-HOMOGENEOUS OBJECTS MAGNIFICATION AND REDUCTION, both documents are incorporated herein by reference.

FIELD OF THE INVENTION

This invention relates generally to computer systems and more specifically to a method, a system and an interface that facilitates localization, organization and use of information elements and user-selectable elements. More precisely, the present invention relates to a method of selecting and identifying information elements.

BACKGROUND OF THE INVENTION

With the always-increasing amount of documents one has to deal with on a daily basis it becomes harder to manage the documents (or information or file) on an item-by-item basis. An alternative document management system adapted to organize large amount of information would be beneficial to the user.

United States Patent Application Publication No.: US 2007/0214169 A1, published on Sep. 13, 2007, which is incorporated herein by reference, discloses a multi-dimensional locating system and method (title). The patent application provides embodiments for managing and displaying axes of documents and other computer-readable files. An axis of documents grouping a plurality of documents along a predetermined order, inter alia, is taught.

The use of an axis of documents brings some specific behavior as oppose to document presentation mechanism in the art. One of the specific of an axis is that one might want to navigate thereon while making selections of documents and seeing a magnified version of a document.

The use of a small number of axes of information elements on a display might result in a non-optimal use of the usable display area. A larger number of axes might be desirable to provide more information to a viewer. A number of challenges need to be addressed in order to provide functions performed on a larger quantity of documents. For instance, axes of documents can take significant space on a display and some cases of use can require displaying a plurality of axes simultaneously on a display. This might clutter the display area while it might not be required to completely see all the axes all the time on the display area.

Also, an axis of information elements can group a plurality of information elements having a commonality. The discrimination of information elements required to be displayed on the axis might change depending of the task to be made. Some tasks might require a more detailed distribution of information elements while some other tasks might require fewer details associated with the same information elements. In some cases significant details are required for a time period and the level of details can be reduced for the remaining time while the information elements remain available for further inquiry or filtering.

In view of the prior art it appears that improvements over the prior art is desirable to improve the user experience and usability either with innovative graphical, structural or functional improvements.

SUMMARY OF THE INVENTION

The following presents a simplified summary of the invention in order to provide a basic understanding of some aspects of the invention. This summary is not an extensive overview of the invention. It is not intended to identify key/critical elements of the invention or to delineate the scope of the invention. Its sole purpose is to present some concepts of the invention in a simplified form as a prelude to the more detailed description that is presented later.

This invention generally refers to user-selectable elements that might represent computer-readable files like documents and multimedia assets. Information elements can alternatively be referred to as, user-selectable elements, menu icons or thumbnails that are associated to an attribute, a category or a tag and arranged as explained below. In order to lighten the reading of the present specification, the term "document" is generally used without intending to limit the scope of the present patent application only to documents, unless expressly specified.

Also, the invention is generally described using an assembly of documents called an array of documents. The array of documents generally refers to, but is not limited to, a comprehensive graphical layout of documents. Hereinbelow referred to as an axis that is a substantially rectilinear arrangement of documents. The axis might not necessarily be straight but preferably has a consistent shape providing a viewer en indication of continuity therebetween documents disposed thereon. In other words, the array of documents can be defined by a single axis or a double axis of documents (or more adjacent axes of documents) and the axis can be completely straight, slightly curved, substantially curved, angled, following a particular shape or having a consistent shape over which documents are disposed in a reasonably consistent fashion adapted to allow a viewer to infer a comprehensive suite of documents. The axes presented in the embodiments below are illustrated in the horizontal position while they could be disposed vertically without departing from the scope of the present disclosure.

An embodiment referred to below provides one or more groups of axes comprising documents thereon. Each axis of documents is preferably rectilinear to easily be located adjacent with other axes of documents to efficiently use the useful display area of the display. A system adapted to carry on the embodiments, a user graphical interface adapted to display the embodiments, a method adapted to provides the steps required to enable the embodiments and a medium storing instructions enabling the method once read by a machine are all considered within the scope of the present invention.

Therefore, an embodiment of the present invention provides an expandable axis of documents displaying one axis of documents in its contracted configuration and a larger number of axes of documents in its expanded configuration.

One embodiment of the present invention provides a mechanism adapted to operatively link a parent axis of documents to children axis of documents.

An embodiment of the present invention provides a mechanism adapted to operatively link a plurality of levels of parent-children axes of documents.

Another embodiment of the present invention provides a mechanism adapted to provide several levels of parent-children axes of documents under the same "grand-parent" axis of documents.

One other embodiment of the present invention provides a group of axes of documents, the group of axes of documents being collapsible to reduce the used area on a display.

An embodiment of the present invention provides children axes of documents that are subsets of the documents found in the parent axis of documents.

Another embodiment of the present invention provides a mechanism adapted to visually discriminate expandable axes of documents.

One other embodiment of the present invention provides a mechanism adapted to visually discriminate expanded axes of documents preferably in relation with their parent axis of documents.

One embodiment of the present invention provides a mechanism adapted to collapse or hide the parent array of documents when children axes of documents thereof are expanded.

One other embodiment of the present invention provides a longitudinal indentation to children axes of documents in respect with their parent axis of documents.

Another embodiment of the present invention provides a means to preset and manage children axes of documents for a parent array of documents.

One embodiment of the present invention provides a mechanism adapted to discriminate attribute(s) used to define the query of the children axes of documents to inform the user of which documents are to be found in each children axis of documents.

Another embodiment of the present invention provides a method of expanding and/or contracting a parent axis of documents by using keys on a keyboard; by pointing a mouse or another pointing device on a display; and touching a display with a finger (or hovered with a user-managed pointer or with a human body part contacting a touch-screen).

One embodiment of the present invention provides animations when a parent axis of documents is expanding its children axes of documents and/or when the children axes of documents are collapsed.

One additional embodiment of the present invention provides a mechanism capable of magnifying one or many axes of documents in a group of parent-children axes of documents.

Another embodiment of the present invention provides a multi-level of children axes of documents that, when expanded under a parent axis, are graphically discriminated such that one can easily appreciate the various children axes levels.

One embodiment of the present invention provides a mechanism adapted to allow adding or removing a children axis of documents once expanded under its parent axis.

Another embodiment of the present invention provides a mechanism adapted to collapse a parent axis of document independently from its children axes of documents.

One other embodiment of the present invention provides a collapse of a parent axis with its children axes on a display to minimize the space required by the axes while providing a mechanism to expand the collapsed axes of documents when required. A parent header or a thumbnail is adapted to remain on the display to allow rapid expansion of the axes when required.

Another embodiment of the present invention provides a horizontal collapsing of the axes while another embodiment provides a vertical collapsing of the axes. One other embodiment provides a combined vertical and horizontal collapsing of the axes.

Another embodiment of the present invention provides a product comprising a machine-readable medium and machine-executable instructions for causing a computer to perform a method comprising providing a first array of information elements adapted to be expanded into at least one other array of information elements on a display.

Another embodiment of the present invention provides a method of displaying information elements on a display of a computer system with arrays of information elements, the method comprising displaying a first array of information elements, expanding the first array of information elements into at least one other array of information elements, wherein the first array of information elements and the at least one other array of information elements have a commonality.

A computer implemented method of managing display area on a display of a computer system, the method comprising providing a plurality of axes of information elements, displaying at least one of the plurality of axes, and providing instructions to expand the displayed at least one of the plurality of axes into at least one other axis of information elements.

Other advantages might become apparent to the skilled reader of this patent specification in light of the appended drawings.

DESCRIPTION OF EMBODIMENT(S) OF THE INVENTION

Figure 1:
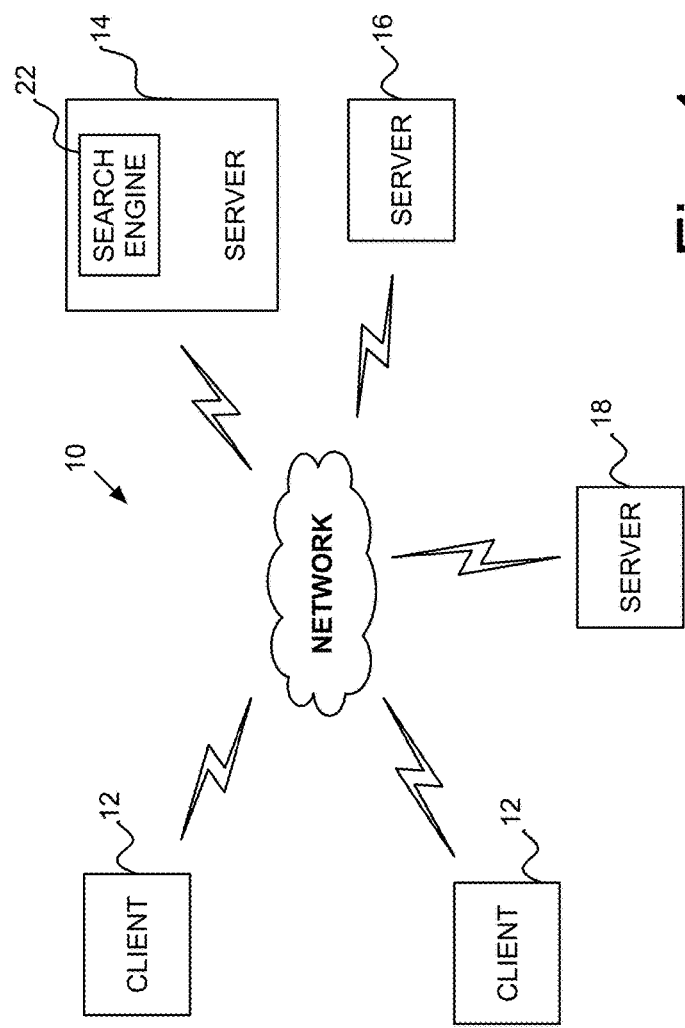
FIG. 1 is a schematic illustration of an exemplary computer network.

The present invention is now described with reference to the drawings, wherein like reference numerals are used to refer to like elements throughout. In the following description, for purposes of explanation, numerous specific details are set forth in order to provide a thorough understanding of the present invention. It may be evident, however, that the present invention may be practiced without these specific details. In other instances, well-known structures and devices are shown in block diagram form in order to facilitate describing the present invention.

The description is separated with subtitles to facilitate its readability. The subtitles include descriptions of portions of invention that might be interrelated despite they might appear under different subtitles. In other words, subtitles are not intended to separate part of the same invention or different inventions described therein but are rather intended to structure the text.

The features provided in this specification mainly relates to basic principles for managing arrays of documents. These code/instructions are preferably stored on a machine-readable medium adapted to be read and acted upon to with a computer or a machine having corresponding code/instructions reading capability.

Exemplary Network

FIG. 1 illustrates an exemplary network 10 in which a system and method, consistent with the present invention, may be implemented. The network 10 may include multiple client devices 12 connected to multiple servers 14, 16, 18 via a network 20. The network 20 may include a local area network (LAN), a wide area network (WAN), a telephone network, such as the Public Switched Telephone Network (PSTN), an intranet, the Internet, Wi-Fi, WiMAX or a combination of networks. Two client devices 12 and three servers 14, 16, 18 have been illustrated as connected to network 20 for simplicity. In practice, there may be more or less client devices and servers. Also, in some instances, a client device may perform the functions of a server and a server may perform the functions of a client device.

The client devices 12 may include devices, such as mainframes, minicomputers, personal computers, laptops, personal digital assistants, telephones, or the like, capable of connecting to the network 20. The client devices 12 may transmit data over the network 20 or receive data from the network 20 via a wired, wireless, or optical connection.

The servers 14, 16, 18 may include one or more types of computer systems, such as a mainframe, minicomputer, or personal computer, capable of connecting to the network 20 to enable servers 14, 16, 18 to communicate with the client devices 12. In alternative implementations, the servers 14, 16, 18 may include mechanisms for directly connecting to one or more client devices 12. The servers 14, 16, 18 may transmit data over network 14 or receive data from the network 20 via a wired, wireless, or optical connection.

In an implementation consistent with the present invention, the server 14 may include a search engine 22 usable by the client devices 12. The servers 14 may store documents, such as web pages, accessible by the client devices 12.

Figure 2:
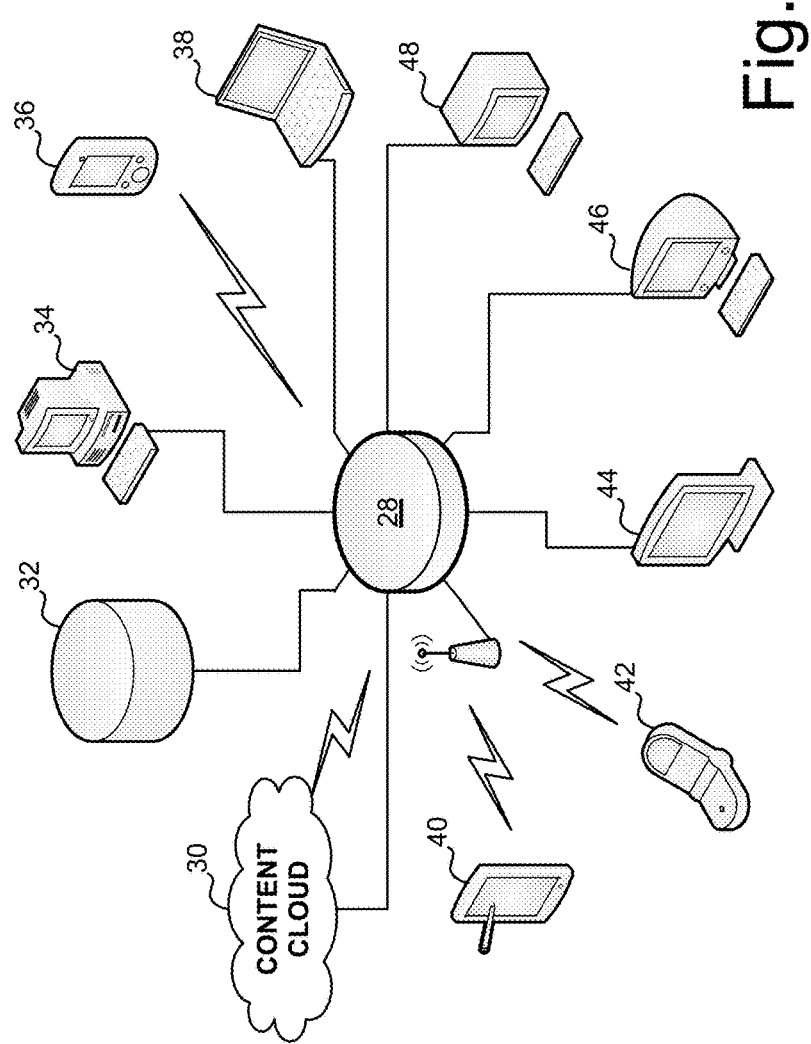
FIG. 2 is a schematic illustration of an exemplary multi-devices network layout.

With reference to FIG. 2, a network 20 includes the content cloud 30, a content database 32, content devices 34-38, and devices 40-48. The network mediator 28 enables the network devices 32-38 to communicate with each other without pre-configuring each device.

The content cloud 30 represent a content source such as the Internet, where content exists at various locations across the globe. The content includes multimedia content such as audio and video. The mediator 28 allows the content cloud to provide content to devices 40-48.

The content database 32 is a storage device that maintains content. The content database 32 may be a stand-alone device on an external communication network. The mediator 28 communicates with the content database 32 to access and retrieve content.

The content devices 34-38 include intelligent devices, such as, for example, personal computers, laptops, cell phones and personal digital assistants. The content devices 32-38 are capable or storing content information.

The devices 40-48 are intelligent devices that receive content from a content source 30-38. However, the devices 30-38 can also operate as servers to distribute content to other client devices.

Exemplary Client Architecture

Figure 3:
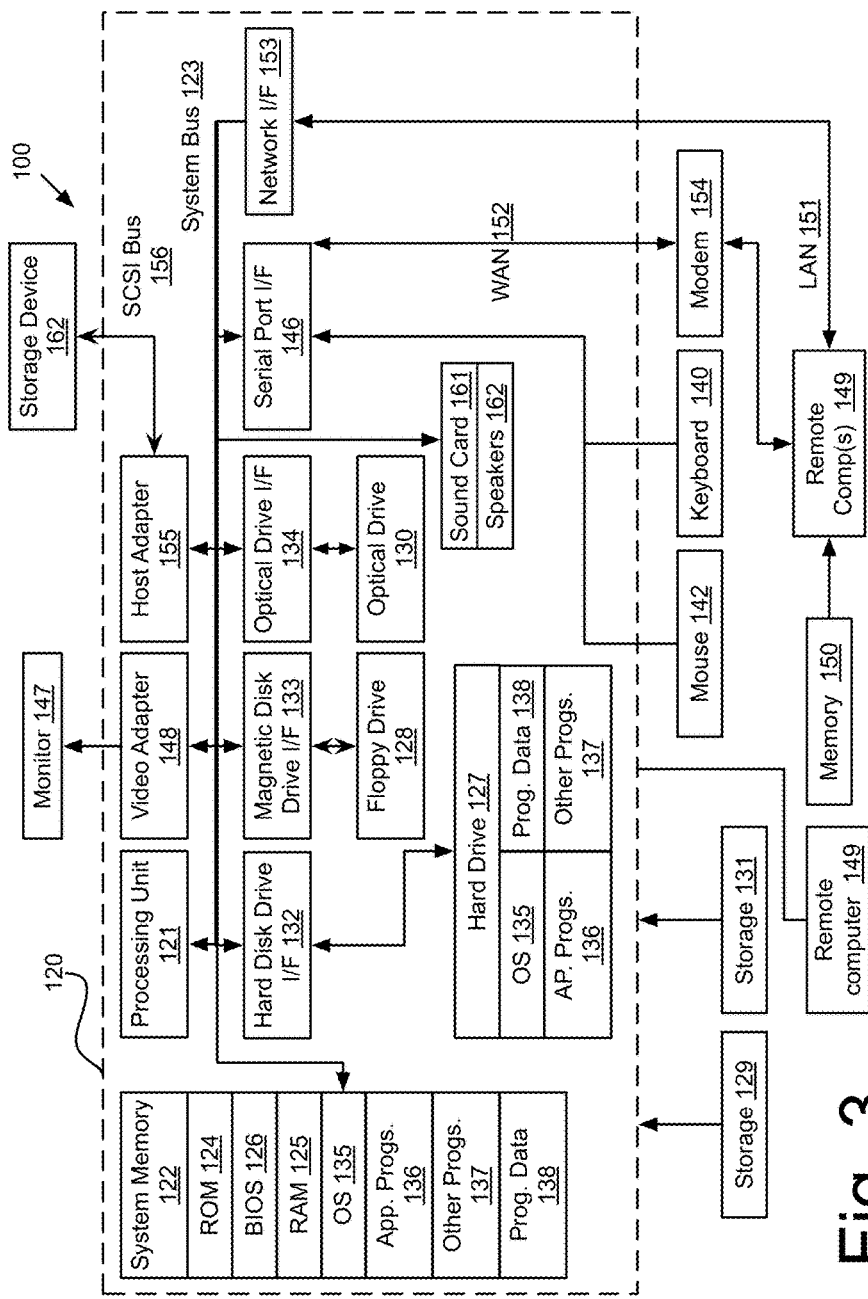
FIG. 3 is a schematic illustration of a typical exemplary computer system.

FIG. 3 and the following discussion provide a brief, general description of an exemplary apparatus in which at least some aspects of the present invention may be implemented. The present invention will be described in the general context of computer-executable instructions, such as program modules, being executed by a personal computer. However, other apparatus may affect the methods of the present invention. Program modules may include routines, programs, objects, components, data structures, applets, WEB 2.0 type of evolved networked centered applications, etc. that perform a task(s) or implement particular abstract data types. Moreover, those skilled in the art will appreciate that at least some aspects of the present invention may be practiced with other configurations, including hand-held devices, multiprocessor systems, microprocessor-based or programmable consumer electronics, network computers, minicomputers, set top boxes, mainframe computers, gaming console and the like. At least some aspects of the present invention may also be practiced in distributed computing environments where tasks are performed by remote processing devices linked through a communications network. In a distributed computing environment, program modules may be located in local and/or remote memory storage devices.

Now, with reference to FIG. 3, an exemplary apparatus 100 for implementing at least some aspects of the present invention includes a general-purpose computing device in the form of a conventional personal computer 120. The personal computer 120 may include a processing unit 121, a system memory 122, and a system bus 123 that couples various system components, including the system memory 122, to the processing unit 121. The system bus 123 may be any of several types of bus structures including a memory bus or memory controller, a peripheral bus, and a local bus using any of a variety of bus architectures. The system memory may include read only memory (ROM) 124 and/or random access memory (RAM) 125. A basic input/output system 126 (BIOS), containing basic routines that help to transfer information between elements within the personal computer 120, such as during start-up, may be stored in ROM 124. The personal computer 120 may also include a hard disk drive 127 for reading from and writing to a hard disk, (not shown), a magnetic disk drive 128 for reading from or writing to a (e.g., removable) magnetic disk 129, and an optical disk drive 130 for reading from or writing to a removable (magneto) optical disk 131 such as a compact disk or other (magneto) optical media. The hard disk drive 127, magnetic disk drive 128, and (magneto) optical disk drive 130 may be coupled with the system bus 123 by a hard disk drive interface 132, a magnetic disk drive interface 133, and a (magneto) optical drive interface 134, respectively. The drives and their associated storage media provide non-volatile (or persistent) storage of machine-readable instructions, data structures, program modules and other data for the personal computer 120. Although the exemplary environment described herein employs a hard disk, a removable magnetic disk 129 and a removable optical disk 131, those skilled in the art will appreciate that other types of storage media, such as magnetic cassettes, flash memory cards, digital video disks, Bernoulli cartridges, random access memories (RAMs), read only memories (ROM), and the like, may be used instead of, or in addition to, the storage devices introduced above.

A number of program modules may be stored on the hard disk 127, magnetic disk 129, (magneto) optical disk 131, ROM 124 or RAM 125, such as an operating system 135 (for example, Windows® NT® 4.0, sold by Microsoft® Corporation of Redmond, Wash.), one or more application programs 136, other program modules 137 (such as "Alice", which is a research system developed by the User Interface Group at Carnegie Mellon University available at www.Alice.org, OpenGL from Silicon Graphics Inc. of Mountain View Calif., or Direct 3D from Microsoft Corp. of Bellevue Wash.), and/or program data 138 for example.

A user may enter commands and information into the personal computer 120 through input devices, such as a keyboard 140, a camera 141 and pointing device 142 for example. Other input devices (not shown) such as a microphone, joystick, game pad, satellite dish, scanner, a touch sensitive screen, accelerometers adapted to sense movements of the user or movements of a device, or the like may also be included. These and other input devices are often connected to the processing unit 121 through a serial port interface 146 coupled to the system bus. However, input devices may be connected by other interfaces, such as a parallel port, a game port, blue tooth connection or a universal serial bus (USB). For example, since the bandwidth of the camera 141 may be too great for the serial port, the video camera 141 may be coupled with the system bus 123 via a video capture card (not shown). The video monitor 147 or other type of display device may also be connected to the system bus 123 via an interface, such as a video adapter 148 for example. The video adapter 148 may include a graphics accelerator. One or more speaker 162 may be connected to the system bus 123 via a sound card 161 (e.g., a wave table synthesizer such as product number AWE64 Gold Card from Creative® Labs of Milpitas, Calif.). In addition to the monitor 147 and speaker(s) 162, the personal computer 120 may include other peripheral output devices (not shown), such as a printer for example. As an alternative or an addition to the video monitor 147, a stereo video output device, such as a head mounted display or LCD shutter glasses for example, could be used.

The personal computer 120 may operate in a networked environment that defines logical connections to one or more remote computers, such as a remote computer 149. The remote computer 149 may be another personal computer, a server, a router, a network PC, a peer device or other common network node, and may include many or all of the elements described above relative to the personal computer 120, although only a memory storage device has been illustrated in FIG. 1. The logical connections depicted in FIG. 2 include a local area network (LAN) 14 and a wide area network (WAN) 152, an intranet and the Internet.

When used in a LAN, the personal computer 120 may be connected to the LAN 14 through a network interface adapter (or "NIC") 153. When used in a WAN, such as the Internet, the personal computer 120 may include a modem 154 or other means for establishing communications over the wide area network 152 (e.g. Wi-Fi, WiMax . . . ). The modem 154, which may be internal or external, may be connected to the system bus 123 via the serial port interface 146. In a networked environment, at least some of the program modules depicted relative to the personal computer 120 may be stored in the remote memory storage device. The network connections shown are exemplary and other means of establishing a communications link between the computers may be used.

The Interface

An interface program providing an interface for managing documents in accordance with an embodiment of the invention is installed on a machine e.g. a computer system. The interface can be programmed using various programming languages e.g. C++, Java or other suitable programming languages. Programming of these languages is well known in the art and is adapted to be readable to provide executable instructions to a hardware system and will not be further described therein. The interface might run through the operating system and the hardware of the computer system or, alternatively, through a network based system e.g. client-server, and/cloud computing system. The interface is adapted to manage documents, computer files, pictures, multimedia content, applications (i.e. computer programs), menu elements, sets of icons and other user-selectable elements in a comprehensive fashion.

Several embodiments follows: Documents are stored on a machine-readable medium and can be retrieved on demand when needed with the interface program. Documents are disposed in an axis-like layout providing a visually comprehensive display arrangement of the documents. The axis can, illustratively, among other possibilities, be based on a selection of attribute(s), tag(s), category(ies), owner of documents, a chronological order, a statistical order or an order representing an increasing file size. Combinations of the above-listed possible choices, inter alia, are possible if desired to build a query adapted to reduce the number of documents to be displayed on the axis. The axis thus helps the viewer to infer additional meaning from the comprehensive layout, consistent display and distribution of the documents thereon.

An axis is adapted to accommodate a single type of documents or, if desired, more than one type of documents, and/or a mix of documents, computer files, multimedia contents and/or user-selectable menu elements. Documents might overlap to squeeze more documents on the space available on the display. Magnification of selected documents on an array can be made to increase the level of details of the selected documents.

Using an axis of documents helps to meaningfully and intuitively display a group of documents. An axis of documents can be embodied as being a substantially linear distribution of documents adapted to dispose each document to be displayed on a line or on a curved line. A curved or a circular axis of documents is also contemplated to be within the scope of the present disclosure. The exact shape of the axis is secondary, what matters, inter alia, is that the layout structure of an axis provides a comprehensive suite of documents from which a viewer can infer an order, a sequence or a relationship between documents. The display of the axis of documents might be made in accordance with a predetermined order (e.g. chronologically), or not. A chronological distribution of documents can sort documents on a timeline. The chronological order can either be linear or non-linear; meaning that a unit of time has always the same graphical length on the display in the linear configuration. The non-linear configuration might non-evenly display similar units of time because the distribution of documents along the timeline prevails over the linearity of time. Another illustrative embodiment is a group of juxtaposed axes of documents grouped together to form an array of documents referring to a matrix of documents.

The display of documents on an array of documents allows to contextually managing documents as a flow, or an ongoing suite, of documents instead of dealing with each document independently. By getting away from managing each document independently it becomes possible to efficiently deal with a significantly higher number of documents and still keep the documents in a structured order.

Each axis of documents, groups documents in accordance with, for example, a selected tag, a category, keywords, or an attribute that is commonly shared among the documents displayed on the axis of documents. The term "attribute" will consistently be used throughout the instant specification to lighten the reading of the text and will include the other commonality between documents described therein unless otherwise specified. The selection of one or more attribute (using Boolean logic for instant) determines which documents will be displayed on the array of documents. If no specific attribute is selected, then, the axis of documents displays all documents. Thus, all documents on the same axis of documents are normally associated with the selected set or combination of attributes (trivial data, like publicity or specific related information, could be added to an axis as long as the outcome remains a presentation of documents resulting from a query without departing from the scope of the present invention). In addition, a timeline can be used to determine the order of the suite of documents on the axis of documents. Chronological ordering is a very intuitive ordering to humans and is one of the preferred ways to present documents on an array of documents. In the case of a matrix of documents, then, one axis (e.g. horizontal direction) of the matrix can represent a timeline while the other axis (e.g. vertical direction, orthogonal, . . . ) represents another criterion like, for example, the type of computer files each document relates to. The other axis can also use a timeline if desirable.

The attributes of a document can be selected to create another axis of documents. The attribute of a document from the newly created axis of documents can be selected to create an additional axis of documents and so on so forth. This is what could be called "relational navigation" and is well described in the United States patent application publication referred to at the beginning of the present patent specification. Hence, the user can "navigate" along axes of documents in accordance with their categorization to visualize the documents. Navigation tools are provided with the interface to allow navigation through various axes of documents, when a plurality of axes is enabled, and through the documents of a single axis of documents. In the context of the present invention, a single suite of documents forming an axis along a timeline is one of the preferred embodiments because it is easy to sequentially navigate throughout the documents disposed along the axis. Other graphical layouts of documents might become obvious for a skilled reader in light of the present application and would be considered within the scope of this application.

When only a portion of the axis is visible, a play of zoom, pan and movements along the axis allows a viewer to navigate on the axis and change the document(s) that is (are) displayed on the display. A small display area could display only one document from the axis of documents while the remaining documents from the axis of documents are not displayed but remain nonetheless at their respective "virtual" position on the axis and ready to be displayed if the axis is scrolled to show other documents. In other words, if we consider a mobile platform like a mobile phone having a small display, the small display area might allow to efficiently displaying only one document at the time. However, the displayed document being part of an axis of documents, the other documents on the axis of documents remain displayable in accordance with their respective position on the axis of documents when the axis is scrolled/navigated/gestured.

Figure 4:
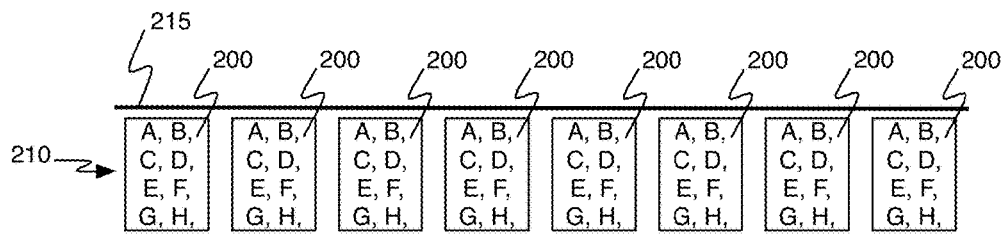
FIG. 4 is a schematic illustration of an array of documents in accordance with an exemplary embodiment of the present invention.

Referring now to FIG. 4, it is possible to appreciate an embodiment depicting a plurality of documents 200 disposed on an axis of documents 210. Rails (or borders) 215 circumscribe the sides of the axis of documents 210 illustrated in FIG. 4. Each document 200 is respectively associated with one or many attributes represented herein by capital letters e.g. A, B, C, D, E, F, G and H. In the axis of documents 210 illustrated in FIG. 4, all documents 200 share the same set of attributes. Therefore, the query used to filter the documents could have been "A AND B AND C AND D AND E AND F AND G AND H", or "A OR B OR C OR D OR E OR F OR G OR H", for instance.

Figure 5:
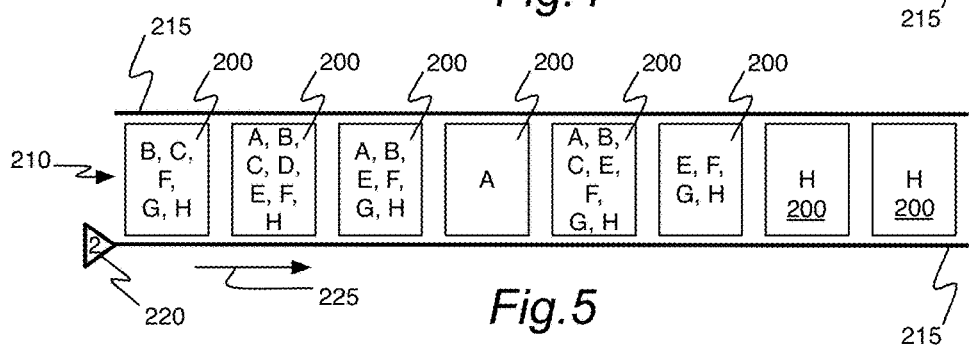
FIG. 5 is a schematic illustration of an expandable array of documents in accordance with an exemplary embodiment of the present invention.

Turning now to FIG. 5 illustrating another series of documents 200 on an axis of documents 210. The documents 200 on this axis of documents 210 are associated with various subsets of attributes for the benefit of the present description. One can notice that the lower rail 215 of the axis of documents 210 have a triangular identification 220 on its left side. The triangular identification 220 of the present embodiment can be of a different nature and is used to indicate that the axis of documents 210 can be expanded into at least one array of document subset (not shown in FIG. 5) that can be called a "child" axis 210 of documents 200 as opposed to a "parent" axis 210 from which the child axis depends from. In the present situation, the number of additional available axes 210 is "two" as indicated in the triangle of the triangular identification 220. The triangular identification 220 used in the Figures is not intended to be restrictive. Any other shape, size or location on a display having a similarly meaning remains within the scope of the present application. The triangular identification 220 is going to be referred herein below as an expansion actuator 220.

The shape of the expansion actuator 220 is disposed toward a first horizontal direction 225 indicating that there are hidden children axes of documents. A selection of the expansion actuator 220 by a pointing device (not illustrated), hand gestures, or by any other means, is going to expand the children axes of documents as it can be appreciated in FIG. 6. The expansion actuator 220 can remain fixed on the display in a first embodiment when the axes 210 are moving longitudinally. In an alternate embodiment, the expansion actuator 220 can move with the axes 210 when its related axes 220 are moving longitudinally.

The expansion actuator 220 is now disposed toward a vertical direction 230 inferring that the children axes of documents 235 are expanded, thus visible below the parent axis 250. In contrast, in another embodiment, the expansion of the children axes could be made toward the opposite direction, above the parent axis, on in a "depth-like" direction emulating a third dimension thereof. A children axes group link 240 and a cooperating opposite expansion actuator 245 are visually defining the subset of children axes of documents 235 associated with parent axis of documents 250. In the present situation, the upper child axis of documents 235.1 has a subset of documents from the parent axis of documents 250 that comprises the attribute "A" represented in bold in each document. Similarly, the lower child axis of documents 235.2 has a subset of documents from the parent axis of documents 250 that comprises the attribute "B" represented in bold in each document. As it can be appreciated, all documents are found in parent axis of documents 250.

Figure 6:
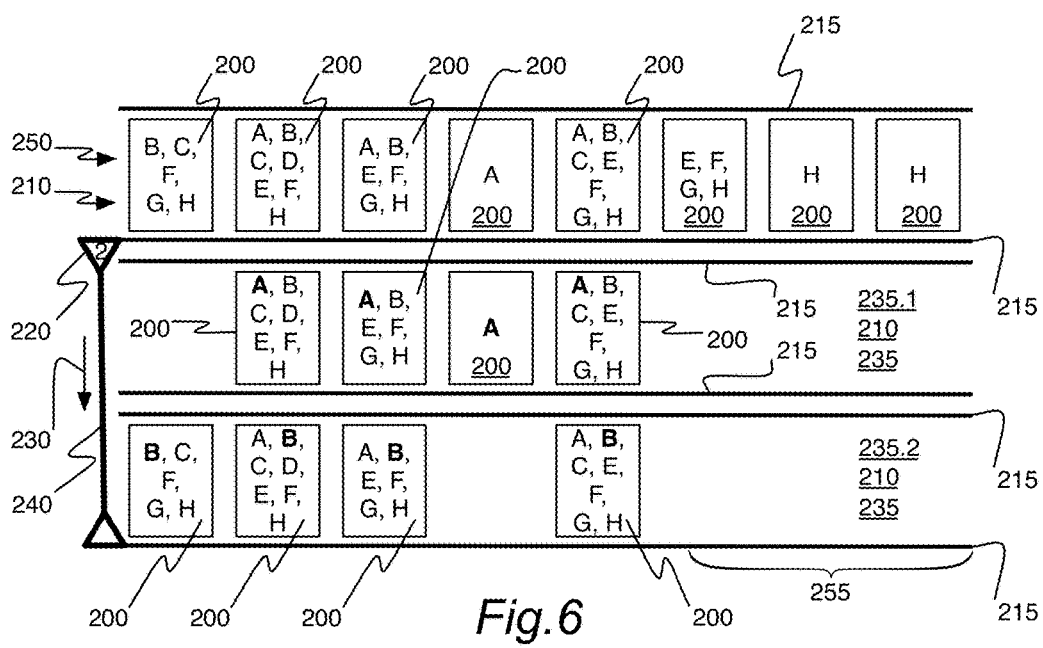
FIG. 6 is a schematic illustration of an expanded array of documents in accordance with an exemplary embodiment of the present invention.

Still in FIG. 6, one can appreciate the documents in the children axes of documents 235 are vertically aligned with their respective copies in the parent axes of documents 250. This vertical alignment helps a viewer to quickly figure out which documents from the parent axis of documents 250 are found in each children axes of documents 235. It is thus clear from the present example that the last three documents to the right 255 do not have the attribute A and the attribute B associated therewith.

A second selection of the expansion actuator 220, of the group link 240 or of the cooperating opposite expansion actuator 245 is going to collapse and hide the children axes of documents 235. Animation of the expansion phase, or the collapsible phase, of the children axes of documents 235 can be performed to further improve the perception of a viewer by further appreciating where the newly visible children axes of documents 235 are coming from or getting back to.

Figure 7:
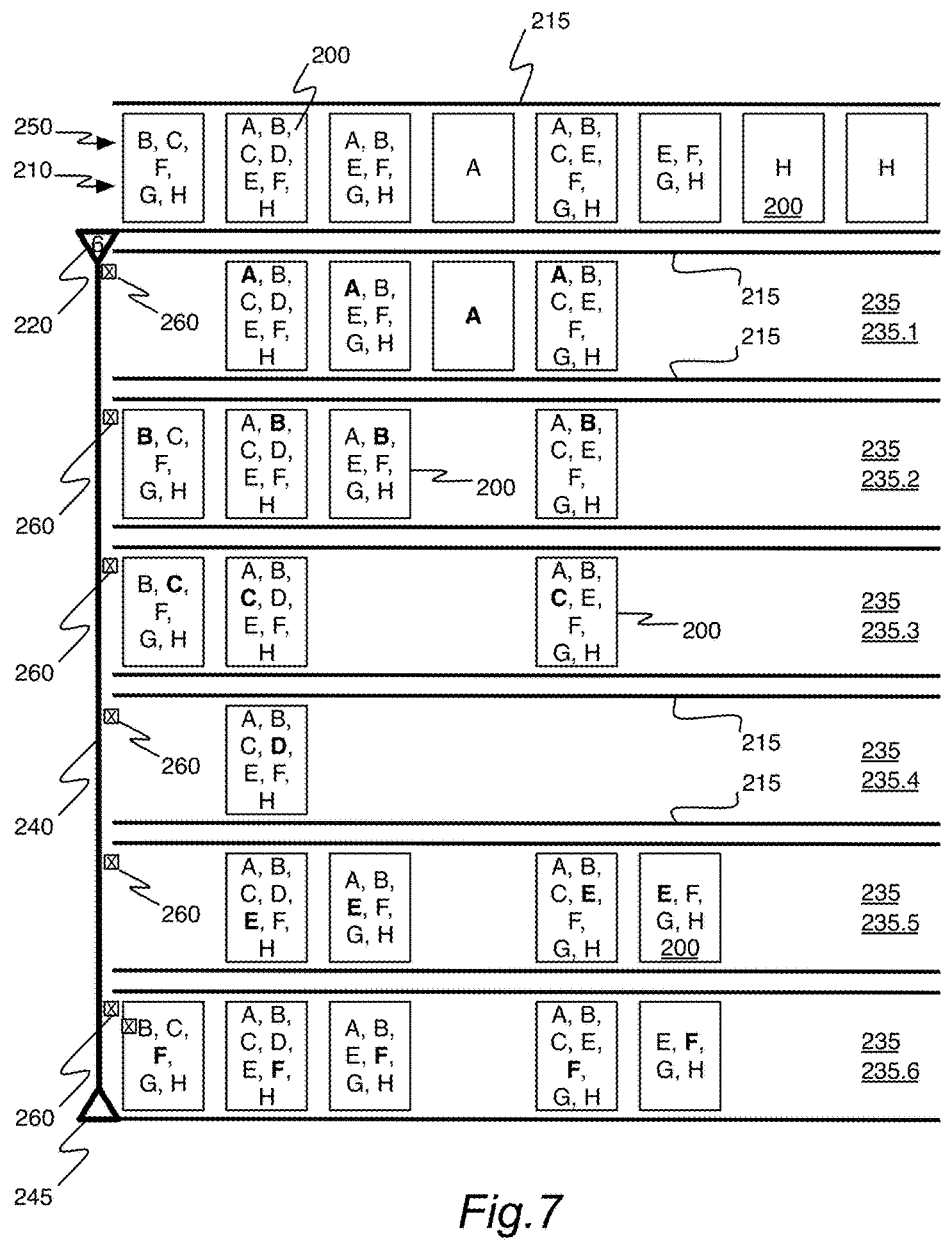
FIG. 7 is a schematic illustration of an expanded array of documents in accordance with an exemplary embodiment of the present invention.

A different number of children axes of documents 235 can be displayed as illustrated in FIG. 7 where six (6) children axes of documents 235.1 through 235.6 are displayed. Each child axis of documents 235 sorting documents having a particular attribute associated therewith as expressed in the following Table 1:

TABLE 1

| Child Axis of Documents | Query Attribute | Display Array |
| --- | --- | --- |
| 235.1 | A | yes |
| 235.2 | B | yes |
| 235.3 | C | yes |
| 235.4 | D | yes |
| 235.5 | E | yes |
| 235.6 | F | yes |
| 235.7 | G | no |

Of course a seventh child axis of documents 235.7 displaying the documents having the attribute G associated therewith could be displayed. A dialogue similar to the exemplary Table 1. A user can preset which children axes of documents 235 s/he wants to see by building and saving the queries for each children axis 235. A dialogue (not illustrated in the Figures) can be displayed when selecting the expansion actuator 220 with a right click of a mouse, hand gesture, or the like. The dialogue can offer which child(ren) axis(es) 235 is (are) to be displayed when the children axes of documents 235 are expanded. Further, the user of the interface can close undesired expanded children axes of documents 235 by selecting the closing icon 260 located on the upper left portion of each expanded child axis of documents 235. In so doing, only the desired children axes of documents 235 remains visible and use the visible area of the display. An additional axis 235 of documents 200 that collects and displays documents that are not displayed on any other axes of documents 235. In other words it is possible to have an axis of documents 235 that is left outside the query used to select the documents 200 present on all other axes of documents 200.

An alternative embodiment provides a supplemental sub-axis of documents that represents the remainder documents of the parent axis of document. By example, in FIG. 7, such axis of documents would have the filter "(NOT A) AND (NOT B) AND (NOT C) AND (NOT D) AND (NOT E) AND (NOT F)" and would provide documents not present in axes having respectively the attributes A, B, C, D, E and F.

One can also appreciate from FIG. 7 that the disposition of documents 200 along axes are also defining columns thereof. Each column being associated with a single document. This is graphically facilitating the visual recognition of the presence or not of a document on each axis. It can easily be appreciated that the document solely having the attribute "A" is only present in axis 235.1 or that the second document from the left is present in all the child arrays of documents.

Figure 8:
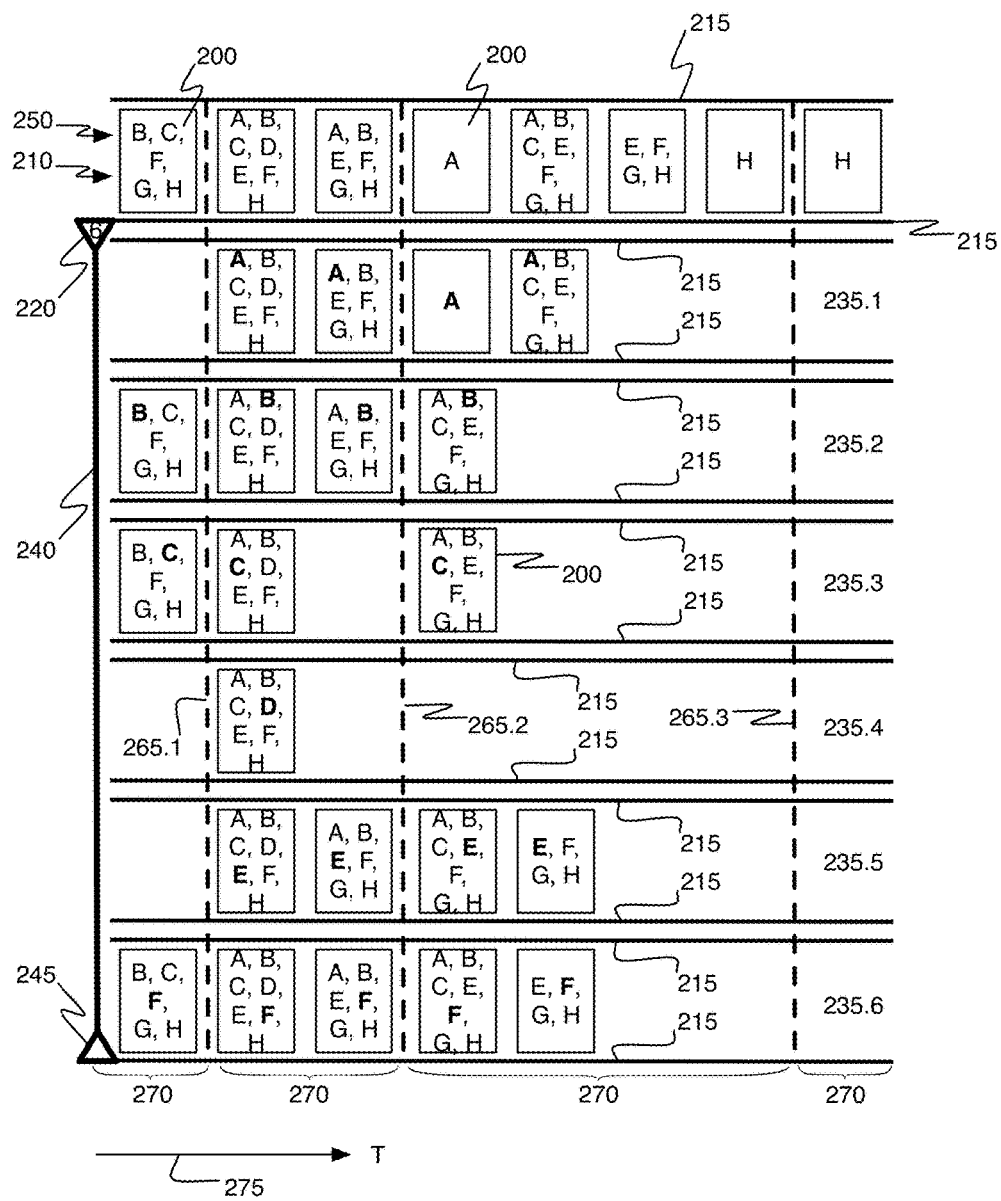
FIG. 8 is a schematic illustration of an expanded array of documents in accordance with an exemplary embodiment of the present invention.

A series of time separators 265 are shown in FIG. 8 illustrating another embodiment. Time separators 265 are used to mark the end of a time period 270 and the beginning of another time period 270. In the illustrative embodiment in FIG. 8, the time separators 265 pass across all axes of documents 210, 250, 235. This is one means to graphically help a viewer to figure out when each document 200 timely relates along a timeline 275 when the axes of documents 210, 235, 250 are illustrating documents along a chronological order. Similarly, in another unillustrated embodiment, separators used to partition axes in accordance with another criterion that time could separate documents along axes. For instance, documents owners, manufacturing sequences and so on so forth.

One embodiment could present the documents justified to the right, in contrast with the justification to the left embodied in FIG. 8, of the time periods on the axes.

Another embodiment of is presenting documents on the axes of FIG. 8, in respect with the time periods, vertically aligned with same documents and further longitudinally disposed on their respective axis in respect with their timely location on the axes. This embodiment can be interpreted from FIG. 8 although it is not exactly depicted therein.

Figure 9:
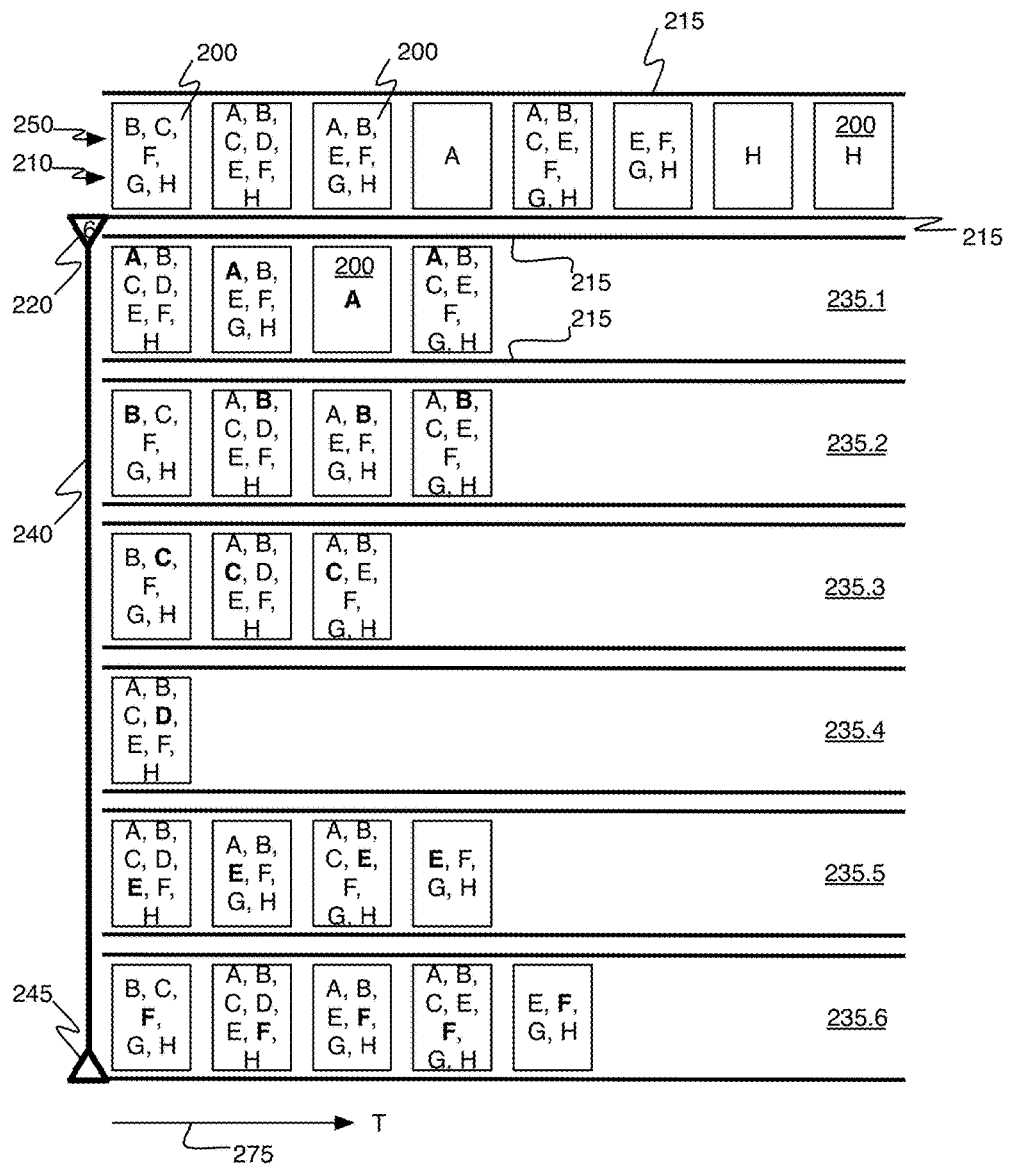
FIG. 9 is a schematic illustration of an expanded array of documents in accordance with an exemplary embodiment of the present invention.

FIG. 9 illustrates another embodiment where the documents 200 displayed on their respective children axes of documents 235 are all grouped on the left side thereof. This might be useful to compact documents on the axes of documents 235 despite it could be harder to appreciate where in time each document 200 relates and from which document 200 on the parent array of documents 250 it is a copy of—since the vertical alignment is not there anymore.

Figure 10:
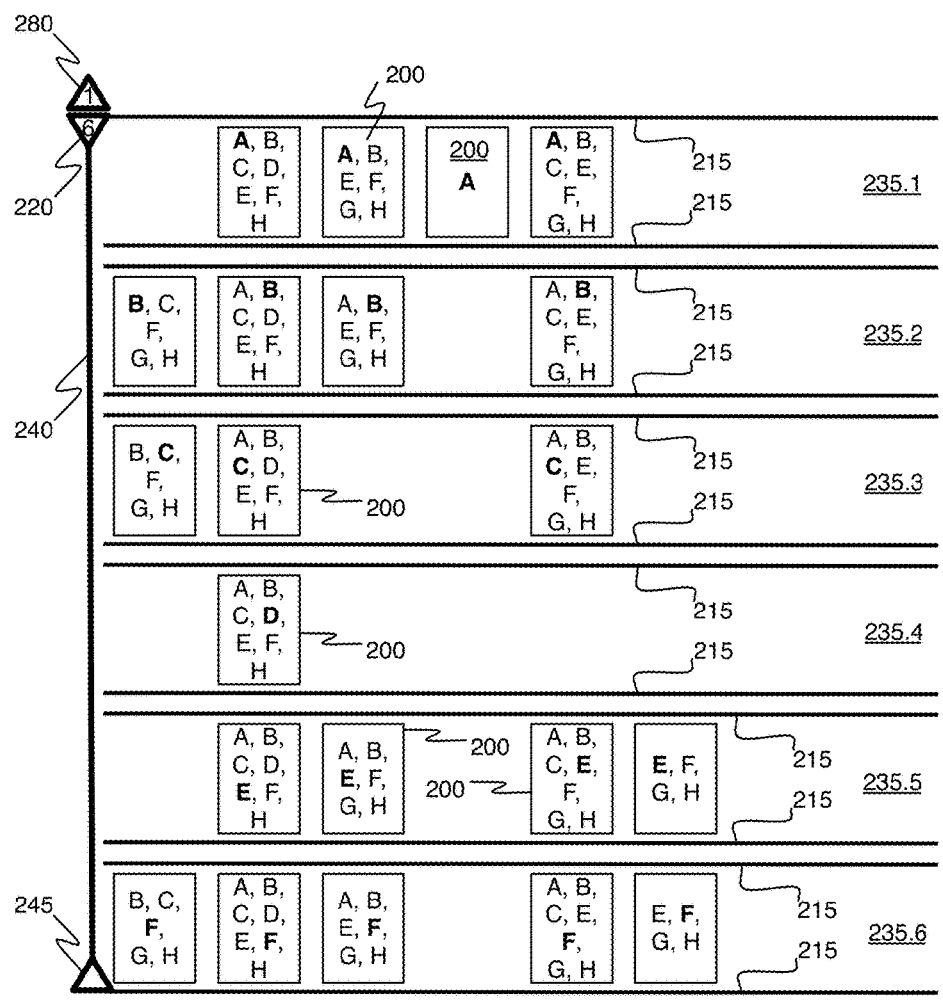
FIG. 10 is a schematic illustration of an expanded array of documents in accordance with an exemplary embodiment of the present invention.

All the documents found in the parent axis of documents 250 can virtually be repeated in the children axes of documents 235. Therefore, displaying the parent axis of documents 250 might not be necessary and its removal would save space on the display. The illustrative example of FIG. 10 shows that the parent axis of documents 250 can be collapsed. A cooperating parent expansion actuator 280 disposed adjacent to the expansion actuator 220 can be added to offer a user to collapse, or expand, the parent axis of documents 250. In the present embodiment the parent axis expansion actuator 280 and the children axes expansion actuator 220 are graphically associated with the upper child axis of documents 235.1. The two expansion actuators, for the parent 280 and the children 240 axes, can be actuated simultaneously upon actuation of one of them to provide an automatic optimization of the display area used to display the axes.

The explanation functions described above are directed to a parent axis of documents 250 having the capability to expand into a plurality of children axes of documents 235. This is one "genealogy" level of axes of documents 250, 235. Additional levels of axes genealogy can be provided by the present invention. When a further genealogy levels can be provided when desirable using a mechanism comparable to the mechanism detailed above in respect of a single axis genealogy level. However, as it can be seen in FIG. 11, a second level of expansion actuators 220.1 and 220.2 can be added adjacent to the first level of expansion actuator 220. In an embodiment, a lateral indentation is desirable to properly illustrate the various possible levels of expansion. The expansion actuators 220 are adjacent, attached or graphically associated in some ways to their related axes of documents 250, 235 to clearly identify to which axis of documents they relate. A different line type or other visual distinctive features can be used to emphasis the distinct genealogy levels associated with parent 250 and children axes of documents 235.

Figure 11:
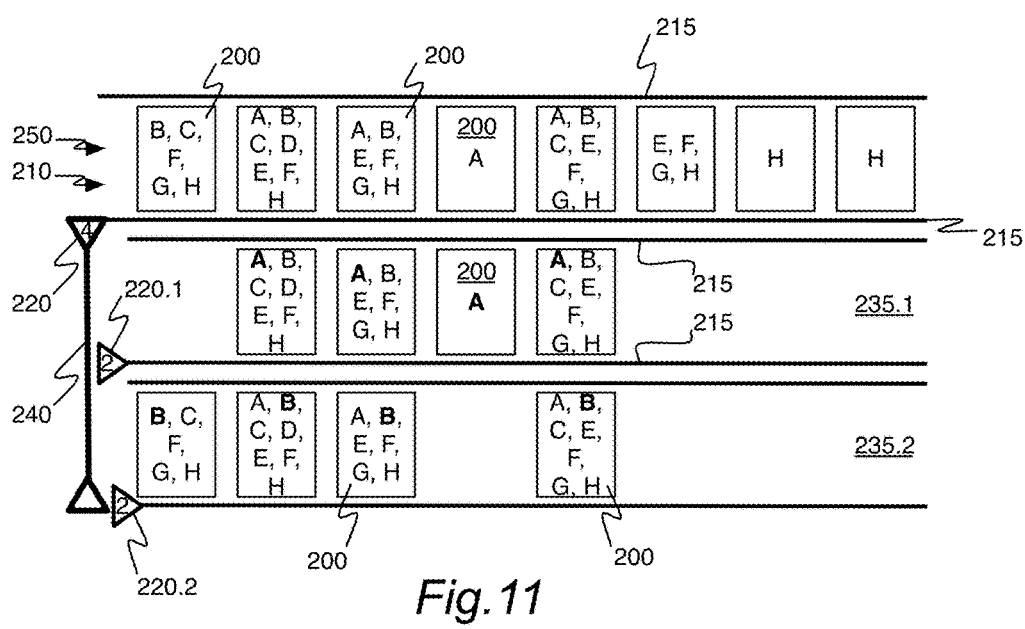
FIG. 11 is a schematic illustration of an expanded array of documents having two levels of expansion in accordance with an exemplary embodiment of the present invention.
Figure 12:
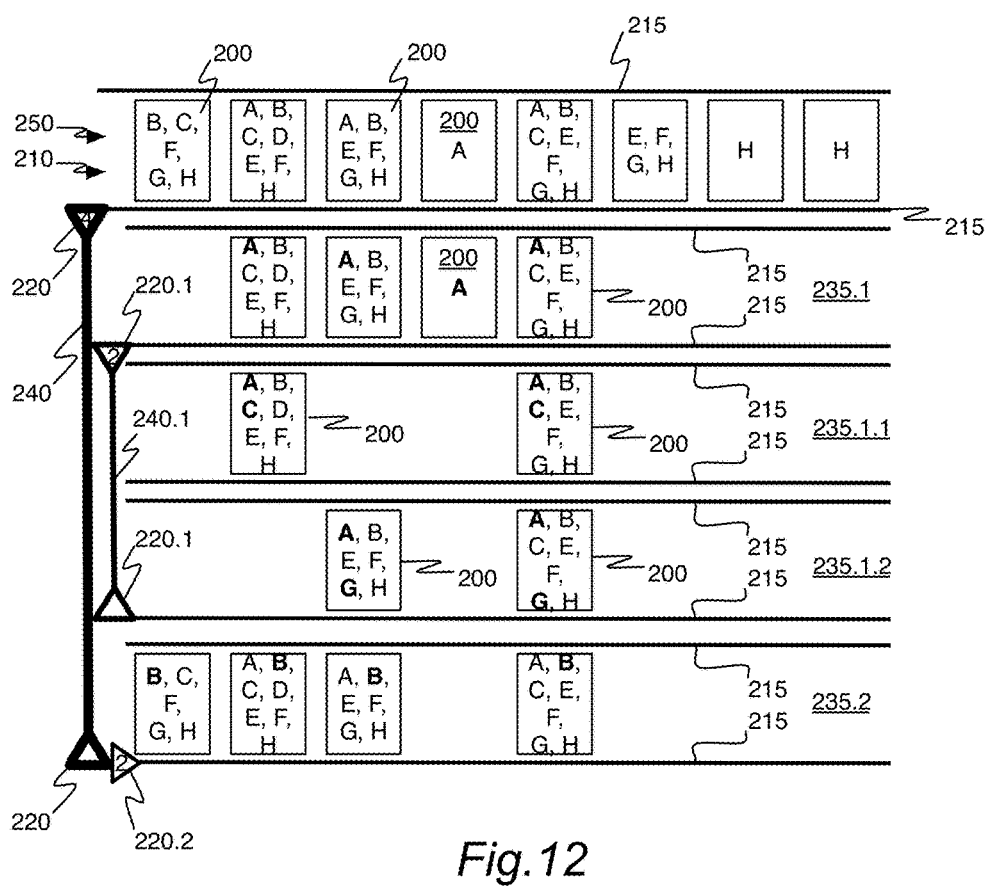
FIG. 12 is a schematic illustration of an expanded array of documents having two levels of expansion in accordance with an exemplary embodiment of the present invention.

FIG. 12 illustrates the same axes of documents layout as the layout illustrated in FIG. 11 with at least the difference that the child axes of documents 235.1 are expanded in two sub-child arrays of documents 235.1.1 and 235.1.2. The second level of sub-child axes of documents 235.1.1 and 235.1.2 is clearly defined with the second level of expansion actuators 220.1 and 220.2 disposed adjacent to the first level of expansion actuator 220. A second group link 240.1 interconnecting the two ends of the expanded expansion actuator 220.1 is used to visually identify the second level of child axes of documents 235.1.1 and 235.1.2.

Still of FIG. 12, one can appreciate a Boolean logic mechanism that is adapted to apply a filter using attribute "A" of axis of documents 250 to obtain children axis of document 235.1. The same Boolean logic is used to get grandchildren axes 235.1.1 and 235.1.2. The first grandchild axis 235.1.1 of documents have a filter defined as attributes "A AND C", while the second grandchild axis 235.1.2 axis of documents filters documents on a basis of attributes "A AND G". In the illustrated embodiment, both grandchild axes 235.1.1 and 235.1.2 have attribute A because they are refined from child array 235.1. In contrast, another embodiment could provide grandchildren axes that do not require the parent to exhaustively posses all their documents 200.

An alternative embodiment provides a supplemental sub-axis of documents that represents the remainder documents of the parent axis of document. For example, such axis of documents would have the filter "A AND (NOT B) AND (NOT C)".

Figure 13:
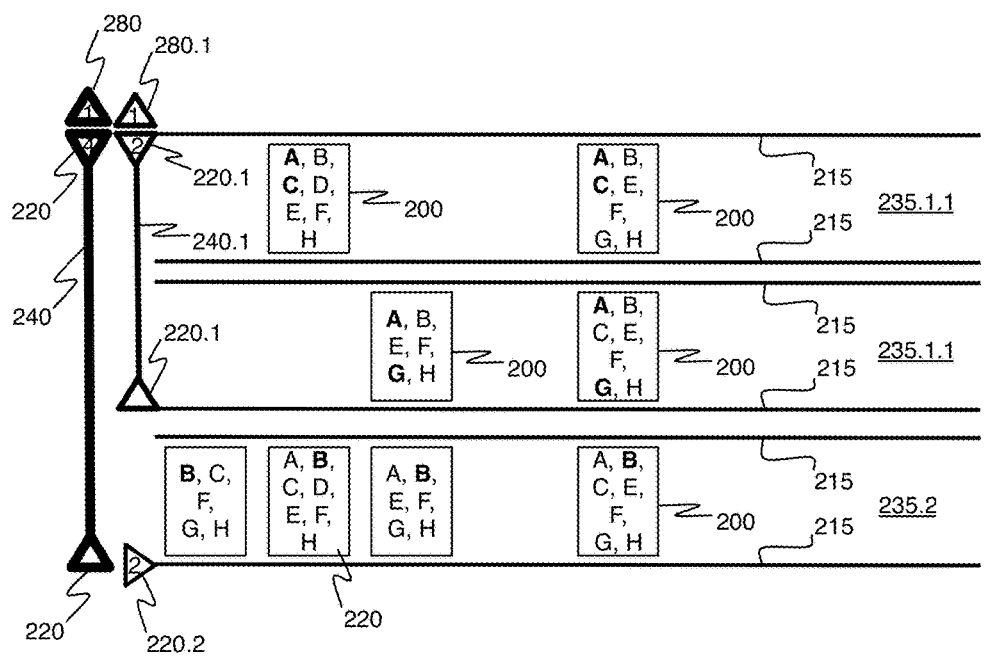
FIG. 13 is a schematic illustration of an expanded array of documents having two levels of expansion in accordance with an exemplary embodiment of the present invention.

The illustrative example of FIG. 13 shows that the parent axis of documents 250 and the child axis of documents 235.1, that has its own expanded grandchildren axes of documents 235.1.1 and 235.1.2, can both be simultaneously collapsed. As previously indicated, the cooperating parent expansion actuator 280 disposed adjacent to the expansion actuator 220 is added to offer a user to collapse or expand the parent axis of documents 250. Similarly, a cooperating parent expansion actuator 280.1 disposed adjacent to the child expansion actuator 220.1 is added to offer a user to collapse or expand the child axis of documents 250.1 in respect with its own sub-child axes of documents 235.1.1 and 235.1.2. In the present embodiment the parent expansion actuator 280 and the expansion actuator 220 are graphically associated with the upper child axis of documents 235.1.

Figure 14:
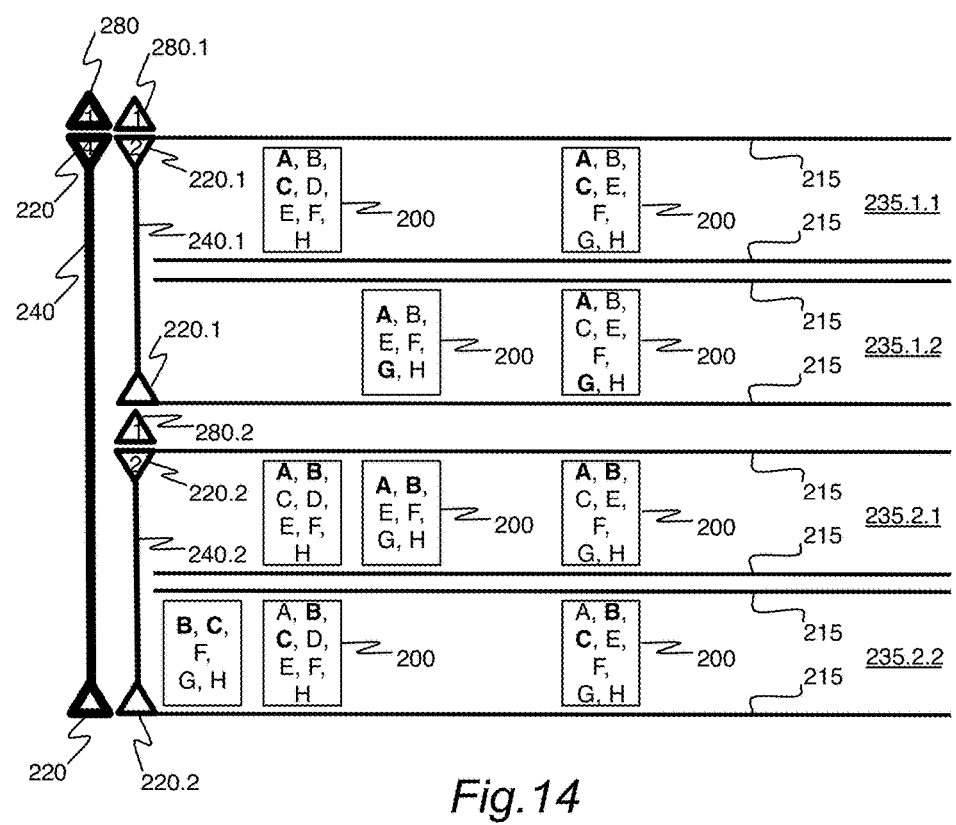
FIG. 14 is a schematic illustration of an expanded array of documents having two levels of expansion in accordance with an exemplary embodiment of the present invention.

Turning now to FIG. 14 illustrating the same embodiments as in FIG. 13. However, in FIG. 14, the child axis of documents 235.2, which is collapsed in this Figure, has expanded grandchildren axes of documents 235.2.1 and 235.2.2. The same cooperating parent expansion actuator 280.2 disposed adjacent to the child expansion actuator 220.2 is added to offer a user a possibility to collapse or expand the child axis of documents 235.2 in respect with its own grand-child axes of documents 235.2.1 and 235.2.2.

Figure 15:
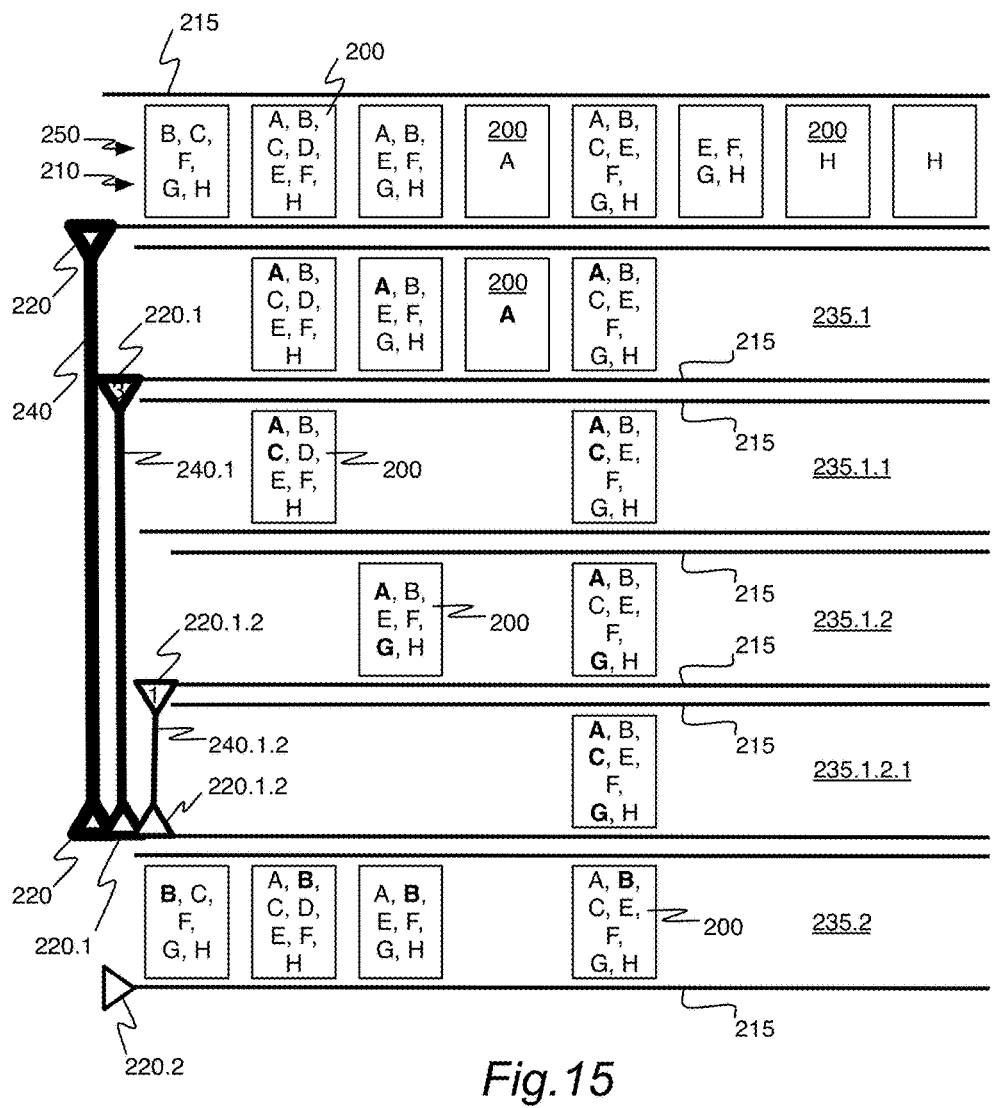
FIG. 15 is a schematic illustration of an expanded array of documents having three levels of expansion in accordance with an exemplary embodiment of the present invention.

A third level of expansion based on the grandchild axis of documents 235.1.2 is illustrated in FIG. 15. One grand-grand child axis of documents 235.1.2.1 is displayed with associated cooperating grandchild expansion actuator 220.1.2 to offer a user to collapse or expand the grandchild axis of documents 235.1.2 in respect with its own grand-grand-child array of documents 235.1.2.1.

The grand-grand-child array of documents 235.1.2.1 inherits all its ancestors' filters (A AND G) and adds its own filter (C) to become "A AND G AND C". This rule may be applied to all descendant axes of documents. It is understood that parent-child, child-grand child and grand-grand child wording is used for illustrating purposes and that other names could be given to axes structures without departing from the scope of the present invention.

Figure 16:
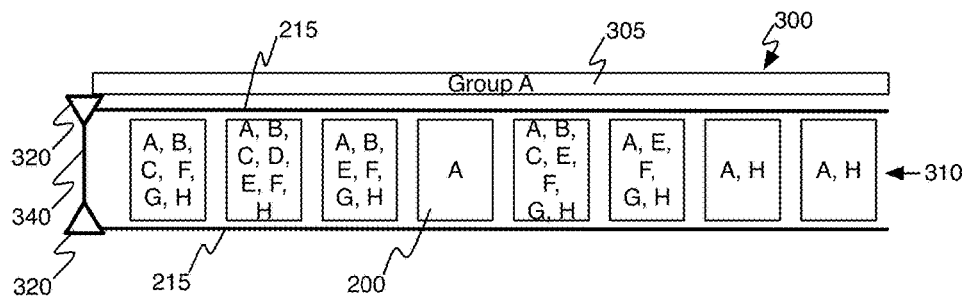
FIG. 16 is a schematic illustration of an expanded group of documents in accordance with an exemplary embodiment of the present invention.

Another exemplary embodiment is illustrated in FIG. 16 to show that a group of axes of documents 300 can be expanded and collapsed. A group header 310 illustratively represents the group of axes of documents A 300. In the present embodiment Group A 300 as a single axis of documents 310 displaying a plurality of documents. A group expansion actuator 320 is added to offer a user to collapse or expand the axis of documents 310.

Figure 17:
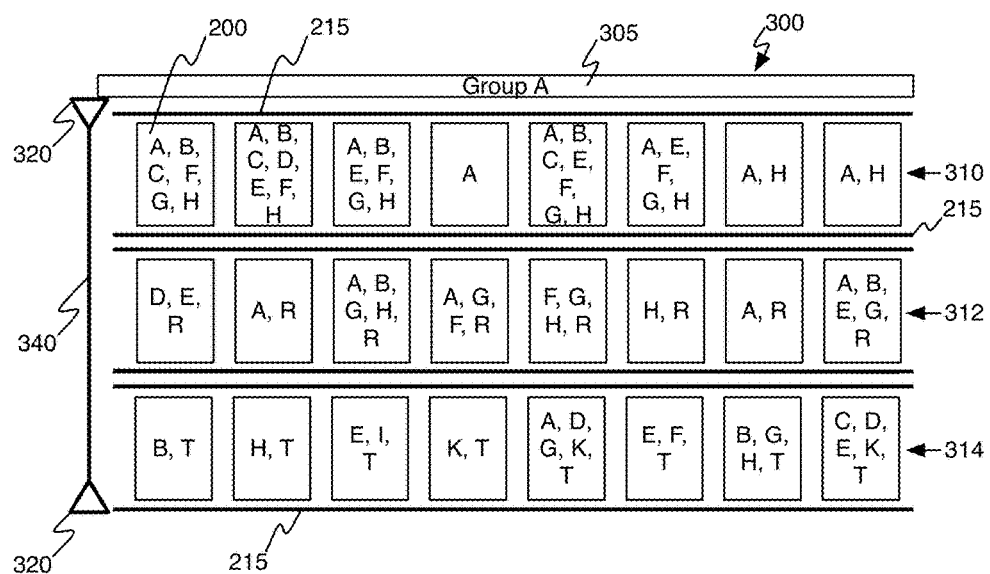
FIG. 17 is a schematic illustration of an expanded group of documents in accordance with an exemplary embodiment of the present invention.

Again, as for expansion and collapsing of arrays of documents discussed above, the Group of axes A 300 can accommodate a number of different axes of documents. In the illustrative example of FIG. 17, Group A 300 comprises three axes of documents 310, 312 and 314. These three axes of documents 310, 312 and 314 are expanded in FIG. 17 with associated expansion actuators 320 and group link 340 interconnecting the expansion actuators 320.

Figure 18:
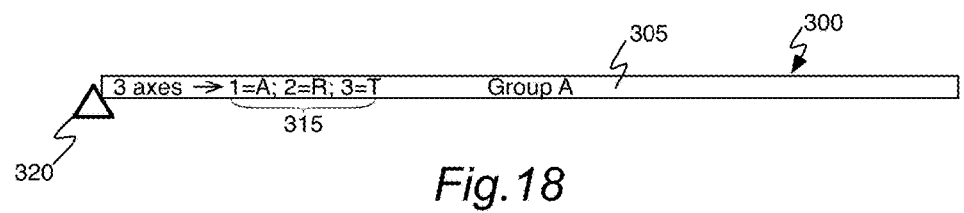
FIG. 18 is a schematic illustration of a collapsed group of documents in accordance with an exemplary embodiment of the present invention.

FIG. 18 illustrates completely collapsed Group A 300 to prevent using precious useful display area when the actual axes of documents 310, 312 and 314 are not required to be visible on the display. However, the collapsed Group A 300 of axes of documents remains visible on the display to quickly access its associated axes of documents 310, 312 and 314 when required. The header 305 of the Group 310 remains visible when the axes of documents 310, 312 and 314 are collapsed to be used when desirable without having to perform further actions to get the Group 300 or its associated arrays. In the present embodiment, group header 305 displays some information about its content. For example, the header 305 informs the viewer of the number of arrays therein 312 and the query of the arrays 315.

The collapsed header 305 can also be considered to comprise all axes therein. The expansion of the axes under the header 305 will distribute documents 200 contained under the header 305 over one, or a plurality, of axes. Similarly, in another embodiment, the collapsed header 305 can also be considered as comprising all documents 200 therein irrespective of their associated axes. In the latter situation, a collapsed header 305 could be expanded in a single axis having all documents 200 found under the group header 305.

Two parent-children axes relations can illustratively be described. The first relation uses documents in the children axes that are present in the parent axis and have an additional attribute to be sorted with. For example, the parent axis can have only documents having the attribute Q, while the children axes respectively have documents having attributes "Q AND A", "Q AND B", and "Q AND C". The second relation does not further refine documents from the parent axis as the first relation does. For example, the parent axis can have documents having attribute "A OR B OR C" and the children respectively have attribute "A", "B", and "C".

Figure 19:
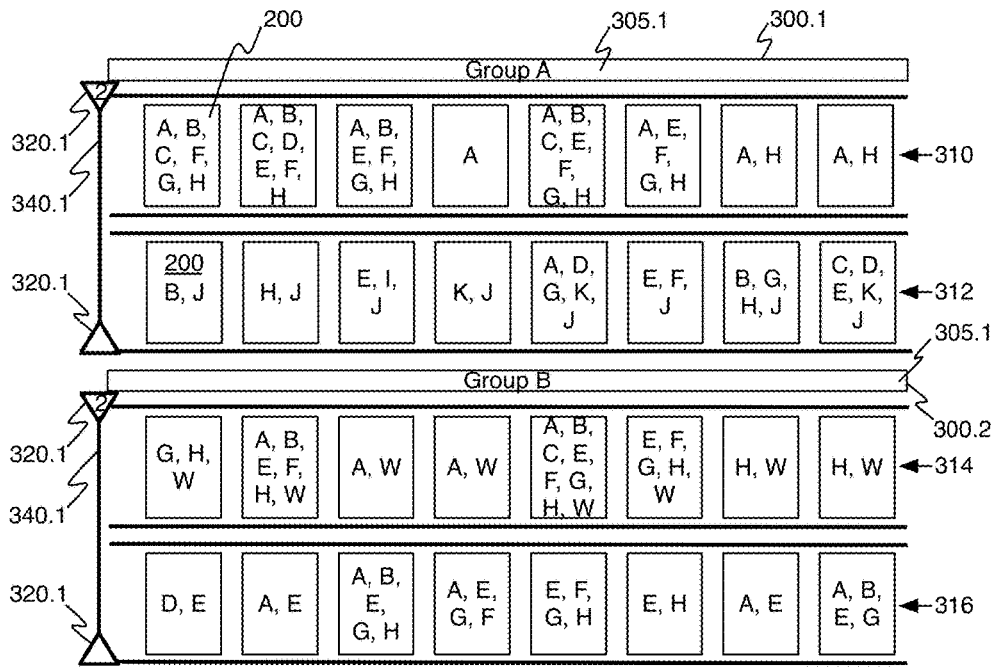
FIG. 19 is a schematic illustration of two expanded groups of documents in accordance with an exemplary embodiment of the present invention.

Turning now to FIG. 19 illustrating two distinct groups of axes 305.1 and 305.2 shown in the same display area (not illustrated but it is understood that all the axes are displayed on a display). Each group 305 could alternatively be displayed in separate adjacent windows or on different displays (e.g. multi-display setup). The two groups of axes of documents 305.1 and 305.2 can accommodate a single or a plurality of axes of documents 310, 312, 314, 316. The two groups have their own respective headers 305.1 and 305.2 to show an identification of the group. Each group may comprise multiple levels of expansion of axes of documents. In this illustrative example, Group A 300.1 is shown to have two axes of documents 310 and 312 using a single level of expansion while Group B 300.2 have also two different axes of documents 314 and 316 still on a single level of expansion. Each group 300 is provided with a respective group expansion actuator 320 to offer the possibility to the user to act and collapse/expand each group 300, separately.

Figure 20:
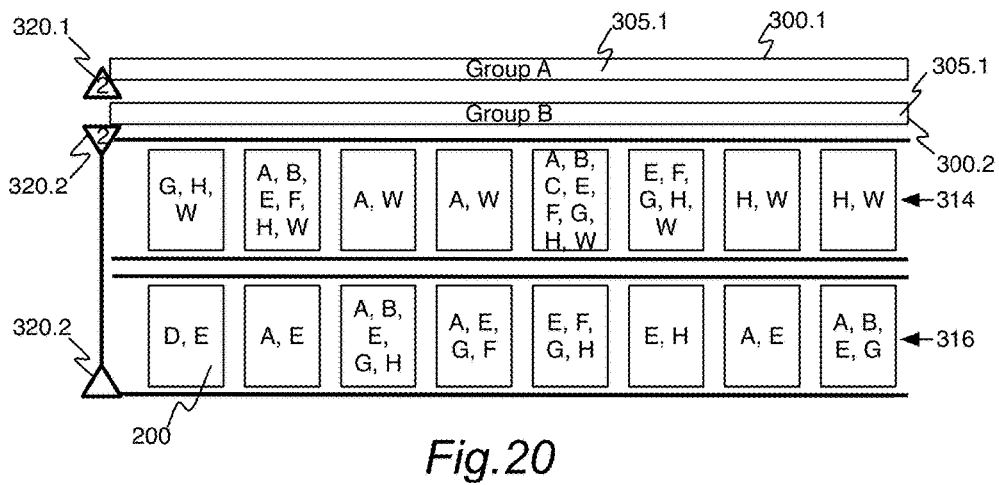
FIG. 20 is a schematic illustration of a collapsed group of documents and an expanded group of documents in accordance with an exemplary embodiment of the present invention.

It can be noted that, despite it is not illustrated in FIG. 19 and FIG. 20, that each axis of documents 310, 312, 314, 316 can also be expanded/collapsed if configured to do so as explained above without departing from the scope of the present invention.

FIG. 20 shows the same two groups 300.1 and 300.2 with the first group 300.1 in the collapsed configuration. The two axes of document 310 and 312 in collapsed group A 300.1 shown in FIG. 19 are now hidden. Group's A 300.1 header 305.1 remains visible to indicate the presence of the group on the display despite it is in its contracted configuration. The contracted group A 300.1 takes less space that remain available for other groups or axes to be used while it remains easily accessible for a user to expand it again to use/manipulate documents included in group A 300.1. The group expansion actuator 320.1 have changed orientation to inform a user that group A 305.1 is in its collapsed configuration and offer him to expand back the axis of documents 310, 312 associated therein. The group expansion actuators 320.2 remains in its expanded position since only group A 300.1 is collapsed and group B 300.2 is expanded.

The expansion and collapsing of both axes of documents and groups of documents are advantageous to rapidly use and leave display area in accordance with the desire of a user. This is a quick and efficient way to change the information displayed on a display while keeping accessible on the display a reduced version of the information presented either by a group or an array of documents. This "blind actuation" effect can be animated such that the user really has the perception that a precise group or axis of documents is expanding or collapsing.

An alternative embodiment is to offer to a user to create children of an axis of documents from the conjunctive parts of the disjunctive normal form of the Boolean expression of the parent axis of document. (We may calculate the disjunctive normal form of any Boolean expression by using well known techniques that can be automated in Boolean logic such applying a combination of De Morgan's laws and distributive laws or extracting the conjunction parts from a table of truth.) The result should be axes of documents with conjunctive only Boolean expressions. By example, if the parent axis of documents have filters "A AND (B OR C)", the user may create to children axis of document having respectively filter "A AND B" and "A AND C". These conjunctive only Boolean expressions axes have many interesting properties to the user, such as know on which condition a document is valuated to be part of the parent complex Boolean expression, or affecting all the attributes of one of the children of the axis of document to be part of the result.

An additional embodiment provides to mechanism adapted to drag and drop documents on axes that is going to associate the set of attributes to the dragged document. For instance, if a document is dragged in a parent axis having the attributes "A AND (B OR C)", it is going to be copied in the children axes respectively having attributes "A AND B" and "A AND C".

Figure 21:
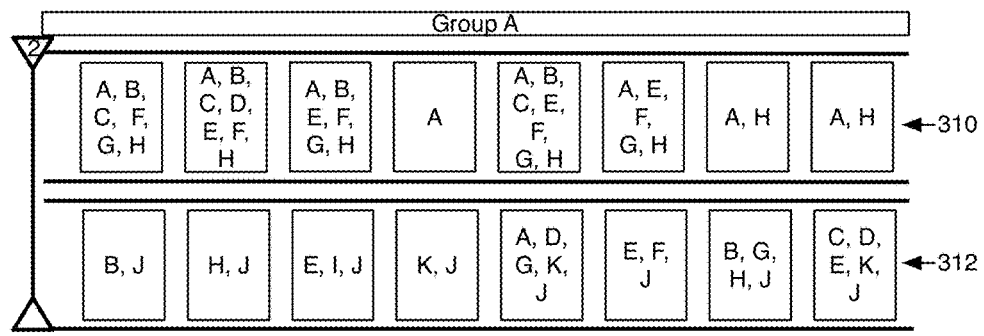
FIG. 21 is a schematic illustration of an expanded group of documents in accordance with an exemplary embodiment of the present invention.
Figure 22:
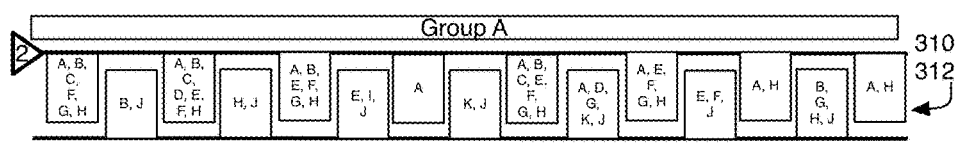
FIG. 22 is a schematic illustration of a contracted axis of documents having visual distinctive features thereon in accordance with an exemplary embodiment of the present invention.

Another embodiment is illustrated in FIG. 21. This embodiment of the invention provides a mechanism for combining two axes into one axis. The first axis 310 is graphically discriminated from the second axis 312 by using a visual distinctive feature (VDF). In this embodiment the VDF is transposed in a vertical displacement. The documents 200 from axis 310 are therefore displayed higher compared to the documents from axis 312 as illustrated in FIG. 22.

Figure 23:
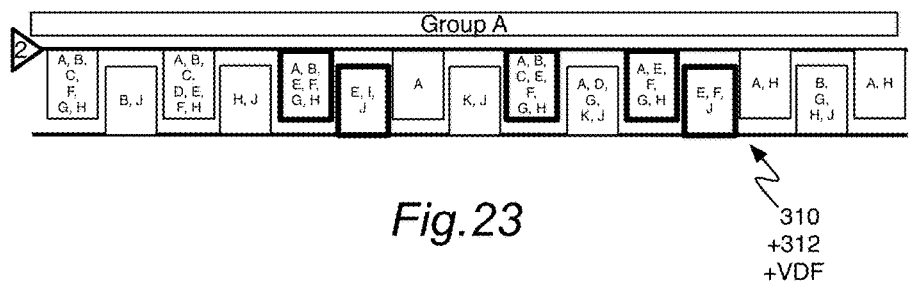
FIG. 23 is a schematic illustration of a contracted axis of documents having visual distinctive features thereon in accordance with an exemplary embodiment of the present invention.

FIG. 23 adds another exemplary VDF. A frame is added on documents to further graphically discriminate some documents. The further discrimination could be based on attributes associated with documents.

Figure 24:
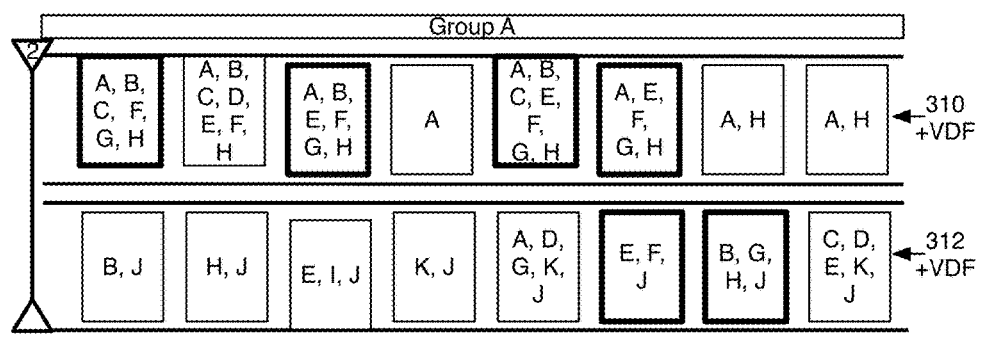
FIG. 24 is a schematic illustration of an expanded group of documents having visual distinctive features thereon in accordance with an exemplary embodiment of the present invention.
Figure 25:
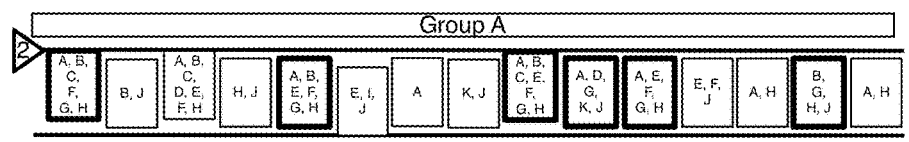
FIG. 25 is a schematic illustration of a contracted axis of documents having visual distinctive features thereon in accordance with an exemplary embodiment of the present invention.

Further adaptations of VDF applied to the first and the second axis as illustrated in FIG. 24 can be applied to the respective documents in the combined axis of FIG. 25.

Figure 26:
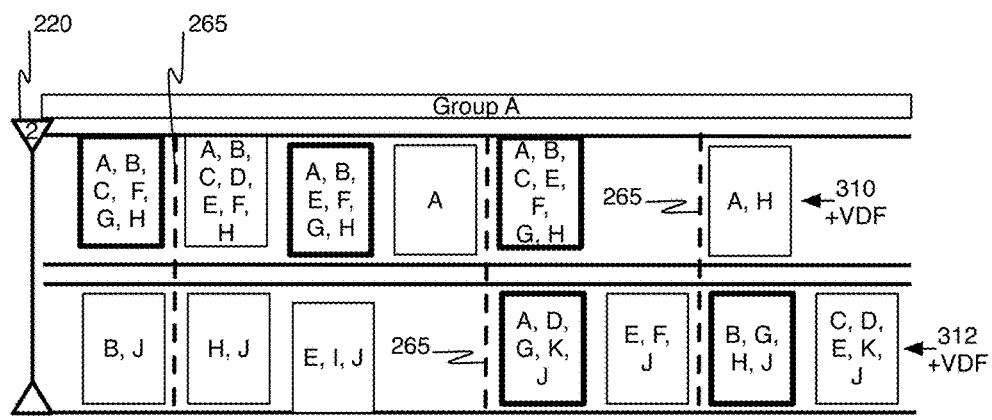
FIG. 26 is a schematic illustration of an expanded group of documents having visual distinctive features thereon in accordance with an exemplary embodiment of the present invention.
Figure 27:
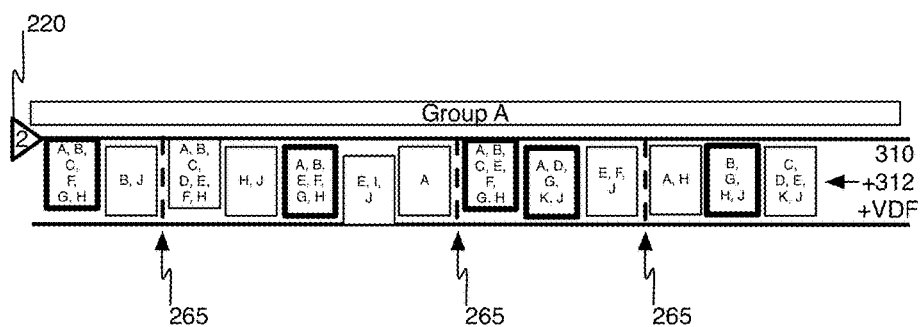
FIG. 27 is a schematic illustration of a contracted axis of documents having visual distinctive features thereon in accordance with an exemplary embodiment of the present invention.

Time separators are added to the first and the second axis 310, 312 in FIG. 26 and applied on the combined axis of FIG. 27.

Figure 28:
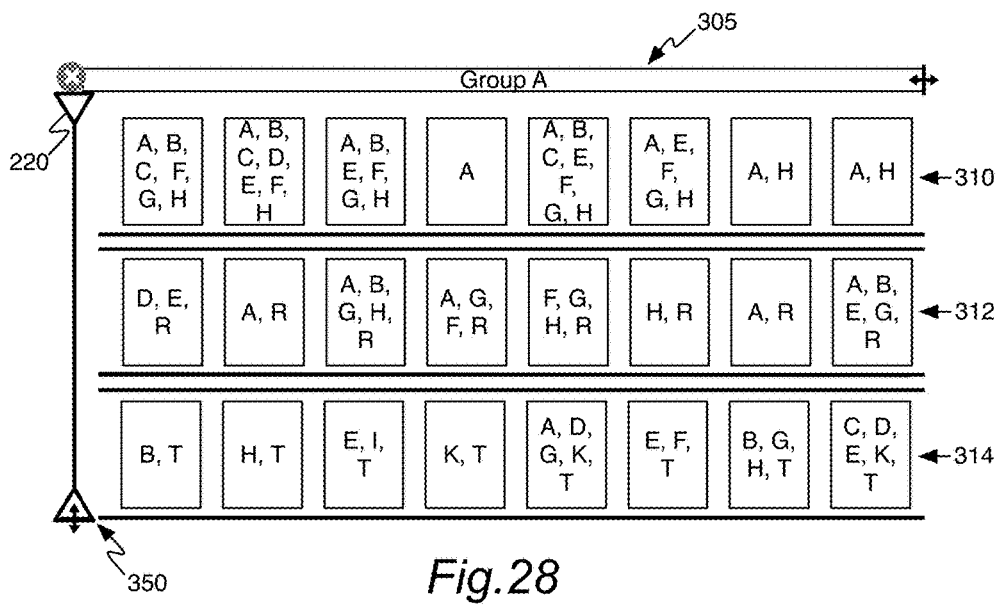
FIG. 28 is a schematic illustration of an expanded group of documents having visual distinctive features thereon in accordance with an exemplary embodiment of the present invention.
Figure 29:
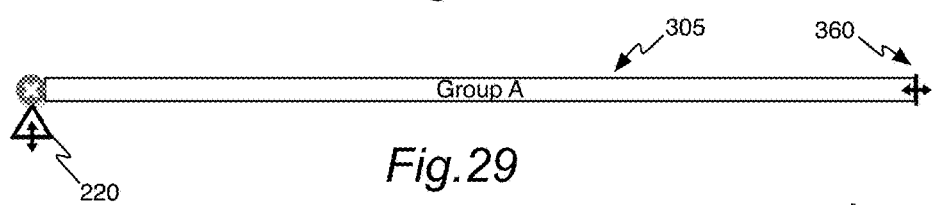
FIG. 29 is a schematic illustration of a contracted group of documents in accordance with an exemplary embodiment of the present invention.

A different embodiment is illustrated in FIG. 28. The axes 310, 312, 314 of group 300 are adapted to collapse by illustratively actuate a collapse actuator 350 to keep only the group header 305 as illustrated in FIG. 29.

Figure 30:
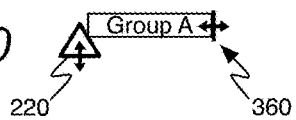
FIG. 30 is a schematic illustration of a contracted group of documents in accordance with an exemplary embodiment of the present invention.
Figure 31:
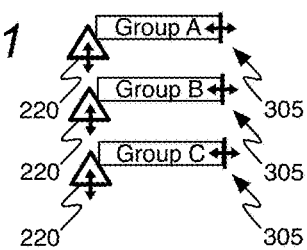
FIG. 31 is a schematic illustration of a plurality of contracted groups of documents in accordance with an exemplary embodiment of the present invention.
Figure 32:
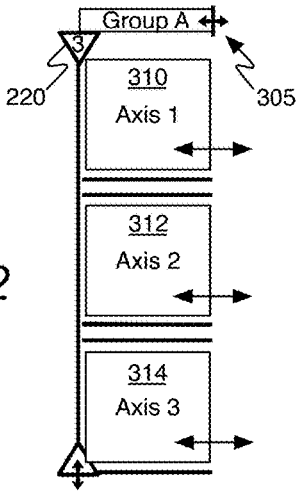
FIG. 32 is a schematic illustration of a plurality of contracted groups of documents in accordance with an exemplary embodiment of the present invention.
Figure 33:
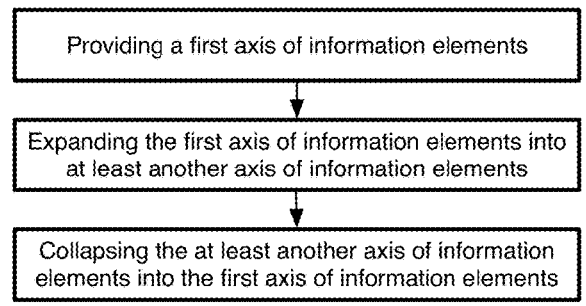
FIG. 33 is a schematic illustrative flow chart of an exemplary embodiment of the present invention.
Figure 34:
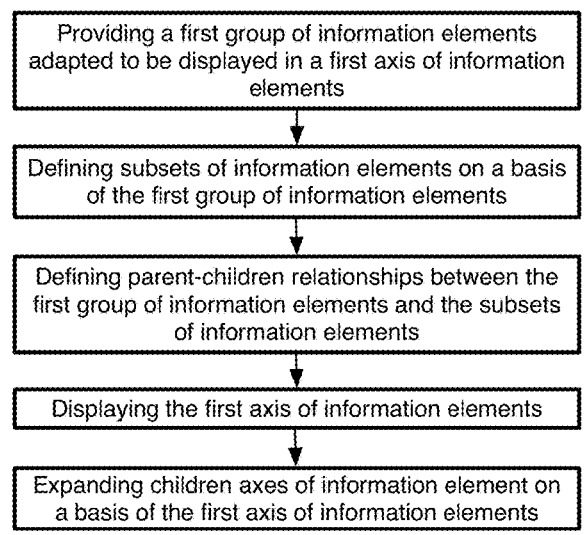
FIG. 34 is a schematic illustrative flow chart of an exemplary embodiment of the present invention.
Figure 35:
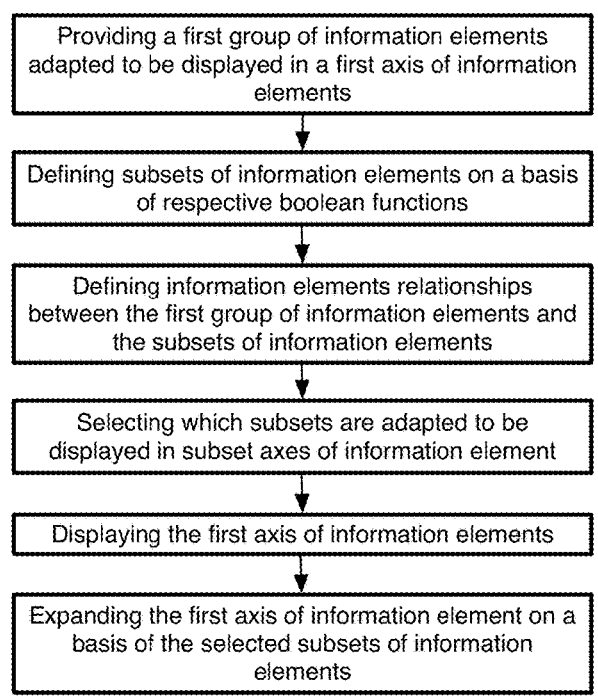
FIG. 35 is a schematic illustrative flow chart of an exemplary embodiment of the present invention.
Figure 36:
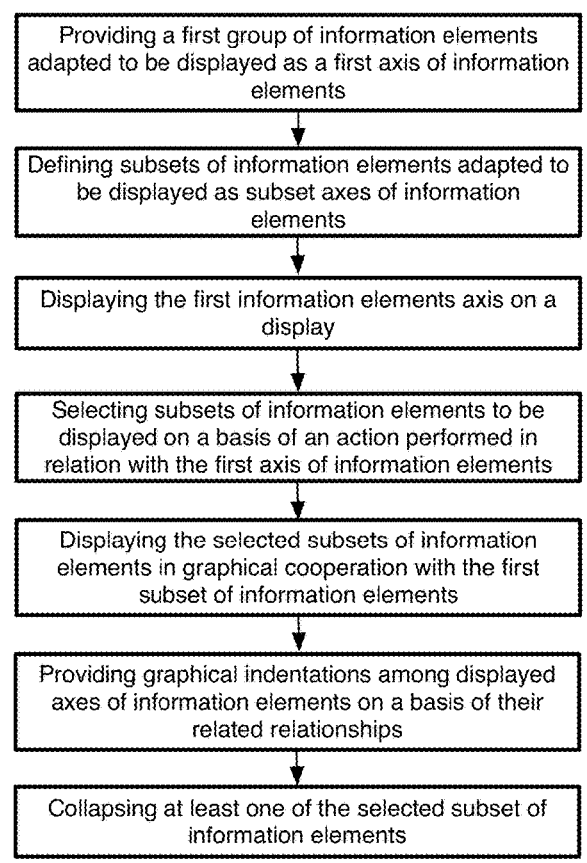
FIG. 36 is a schematic illustrative flow chart of an exemplary embodiment of the present invention.
Figure 37:
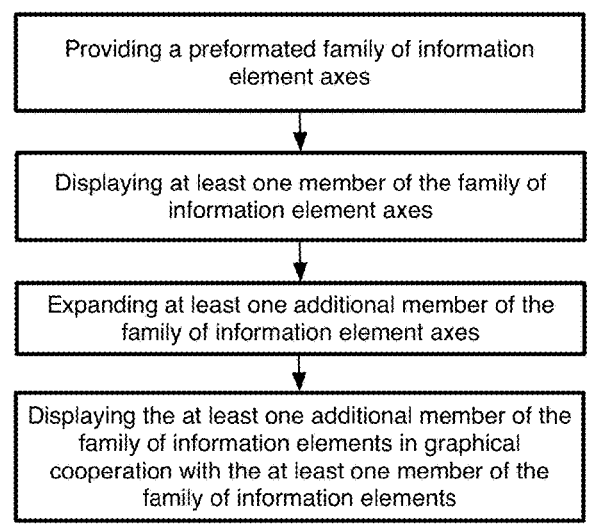
FIG. 37 is a schematic illustrative flow chart of an exemplary embodiment of the present invention

FIGS. 30, 31 and 32 are concerned with a horizontal collapse 360 to only keep a visual portion of the group header 305 as illustrated in FIG. 30. The same principle can be applied simultaneously with a plurality of group headers 305 as exemplified in FIG. 31. The horizontal collapse can also be applied on a group 305 with one or a plurality of axes 310, 312, 314; see FIG. 32.

FIGS. 33 through 37 are illustrating exemplary steps of various embodiments of the invention to complement the aforementioned description.

The description and the drawings that are presented above are meant to be illustrative of the present invention. They are not meant to be limiting of the scope of the present invention. Modifications to the embodiments described may be made without departing from the present invention, the scope of which is defined by the following claims:

What is claimed is:

1. An apparatus for implementing a user interface adapted to display a plurality of substantially rectilinear axes of user-selectable elements on a display, the apparatus comprising:

a memory module; and a processing unit in communication with the memory module, the processing unit being operative for executing computer readable program code stored on a non-transient computer readable medium for implementing a method for axially aligning same user-selectable elements displayed on a plurality of axes, the method comprising, displaying a first expandable axis of user-selectable elements displaying a plurality of user-selectable elements along a substantially rectilinear orientation on the display, each user-selectable element of which array is associated with one or more attributes, all user-selectable elements of which array share in common one or more attributes, and in response to an input provided by a user, displaying a first additional axis of user-selectable elements displaying a plurality of user-selectable elements along a substantially rectilinear orientation on the display, the first additional axis of user-selectable elements being adjacent and parallel from the first expandable axis of user-selectable elements, wherein all user-selectable elements of the first additional axis that is displayed in response to the input provided by a user share in common one or more attributes, and wherein each user-selectable element of the first additional axis that is displayed in response to the input provided by a user comprises at least one user-selectable element of the first expandable array of user-selectable elements, wherein the at least one user-selectable element displayed on the first additional axis of user-selectable elements is axially located in a position substantially orthogonally aligned with its location on the first expandable axis of user-selectable elements to provide axial correspondence of user-selectable elements simultaneously displayed on more than one axis of user-selectable elements.

2. The apparatus of claim 1, further displaying a second axis of user-selectable elements, all user-selectable elements thereof sharing in common one or more attributes.

3. The apparatus of claim 2, wherein user-selectable elements of the second axis of user-selectable elements being a user-selectable element of the first expandable axis, the user-selectable elements displayed on the second additional axis of user-selectable elements being axially located in a position substantially orthogonally aligned with its location on the first expandable axis of user-selectable elements to provide axial correspondence of user-selectable elements simultaneously displayed on more than one axis of user-selectable elements.

4. The apparatus of claim 1, wherein user-selectable elements are displayed on the axes of user-selectable elements in accordance with a collation function.

5. The apparatus of claim 4, wherein the collation function is a chronological order, the first expandable array and the first additional array are displayed with a common timeline.

6. The apparatus of claim 5, wherein the chronological order further comprises units of time separated with time units on the axis of user-selectable elements.

7. The apparatus of claim 6, wherein all the axes of user-selectable elements share the time units.

8. A method for axially aligning same user-selectable elements displayed on a plurality of axes, the method comprising, displaying a first expandable axis of user-selectable elements displaying a plurality of user-selectable elements along a substantially rectilinear orientation on the display, each user-selectable element of which array is associated with one or more attributes, all user-selectable elements of which array share in common one or more attributes, and in response to an input provided by a user, displaying a first additional axis of user-selectable elements displaying a plurality of user-selectable elements along a substantially rectilinear orientation on the display, the first additional axis of user-selectable elements being adjacent and parallel from the first expandable axis of user-selectable elements, wherein all user-selectable elements of the first additional axis that is displayed in response to the input provided by a user share in common one or more attributes, and wherein each user-selectable element of the first additional axis that is displayed in response to the input provided by a user comprises at least one user-selectable element of the first expandable array of user-selectable elements, wherein the at least one user-selectable element displayed on the first additional axis of user-selectable elements is axially located in a position substantially orthogonally aligned with its location on the first expandable axis of user-selectable elements to provide axial correspondence of user-selectable elements simultaneously displayed on more than one axis of user-selectable elements.

9. The method of claim 8, further displaying a second axis of user-selectable elements, all user-selectable elements thereof sharing in common one or more attributes.

10. The method of claim 9, wherein user-selectable elements of the second axis of user-selectable elements being a user-selectable element of the first expandable axis, the user-selectable elements displayed on the second additional axis of user-selectable elements being axially located in a position substantially orthogonally aligned with its location on the first expandable axis of user-selectable elements to provide axial correspondence of user-selectable elements simultaneously displayed on more than one axis of user-selectable elements.

11. The method of claim 8, wherein user-selectable elements are displayed on the axes of user-selectable elements in accordance with a collation function.

12. The method of claim 11, wherein the collation function is a chronological order, the first expandable array and the first additional array are displayed with a common timeline.

13. The method of claim 12, wherein the chronological order further comprises units of time separated with time units on the axis of user-selectable elements.

14. The method of claim 13, wherein all the axes of user-selectable elements share the time units.

15. A non-transitory computer-readable medium having stored thereon computer-readable instructions that, then executed by a processor of a computer system, cause the computer system to perform operations for axially aligning same user-selectable elements displayed on a plurality of axes, the operations comprising, displaying a first expandable axis of user-selectable elements displaying a plurality of user-selectable elements along a substantially rectilinear orientation on the display, each user-selectable element of which array is associated with one or more attributes, all user-selectable elements of which array share in common one or more attributes, and in response to an input provided by a user, displaying a first additional axis of user-selectable elements displaying a plurality of user-selectable elements along a substantially rectilinear orientation on the display, the first additional axis of user-selectable elements being adjacent and parallel from the first expandable axis of user-selectable elements, wherein all user-selectable elements of the first additional axis that is displayed in response to the input provided by a user share in common one or more attributes, and wherein each user-selectable element of the first additional axis that is displayed in response to the input provided by a user comprises at least one user-selectable element of the first expandable array of user-selectable elements, wherein the at least one user-selectable element displayed on the first additional axis of user-selectable elements is axially located in a position substantially orthogonally aligned with its location on the first expandable axis of user-selectable elements to provide axial correspondence of user-selectable elements simultaneously displayed on more than one axis of user-selectable elements.

16. The non-transitory computer-readable medium of claim 15, further displaying a second axis of user-selectable elements, all user-selectable elements thereof sharing in common one or more attributes.

17. The non-transitory computer-readable medium of claim 16, wherein user-selectable elements of the second axis of user-selectable elements being a user-selectable element of the first expandable axis, the user-selectable elements displayed on the second additional axis of user-selectable elements being axially located in a position substantially orthogonally aligned with its location on the first expandable axis of user-selectable elements to provide axial correspondence of user-selectable elements simultaneously displayed on more than one axis of user-selectable elements.

18. The non-transitory computer-readable medium of claim 15, wherein user-selectable elements are displayed on the axes of user-selectable elements in accordance with a collation function.

19. The non-transitory computer-readable medium of claim 18, wherein the collation function is a chronological order, the first expandable array and the first additional array are displayed with a common timeline.

20. The non-transitory computer-readable medium of claim 19, wherein the chronological order further comprises units of time separated with time units on the axis of user-selectable elements.

* * * * *